United States Patent
Hunwick

(10) Patent No.: US 12,415,733 B2
(45) Date of Patent: Sep. 16, 2025

(54) PRODUCTION OF LITHIUM CHEMICALS AND METALLIC LITHIUM

(71) Applicant: ICSIP PTY LTD, Sydney (AU)

(72) Inventor: Richard Hunwick, Roseville Nsw (AU)

(73) Assignee: ICSIP PTY LTD, Sydney (AU)

( * ) Notice: Subject to any disclaimer, the term of this patent is extended or adjusted under 35 U.S.C. 154(b) by 664 days.

(21) Appl. No.: 17/291,603

(22) PCT Filed: Nov. 29, 2019

(86) PCT No.: PCT/AU2019/051308
§ 371 (c)(1),
(2) Date: May 5, 2021

(87) PCT Pub. No.: WO2020/107074
PCT Pub. Date: Jun. 4, 2020

(65) Prior Publication Data
US 2021/0387860 A1    Dec. 16, 2021

(30) Foreign Application Priority Data
Nov. 29, 2018   (AU) ............................... 2018904540

(51) Int. Cl.
*C01D 15/02*    (2006.01)
*B01J 3/04*     (2006.01)
(Continued)

(52) U.S. Cl.
CPC ............... *C01D 15/02* (2013.01); *B01J 3/04* (2013.01); *B01J 19/0066* (2013.01); *B01J 19/18* (2013.01);
(Continued)

(58) Field of Classification Search
None
See application file for complete search history.

(56) References Cited

U.S. PATENT DOCUMENTS 2,024,026 A    12/1935  Harry et al.
3,965,239 A     6/1976  Posel
(Continued)

FOREIGN PATENT DOCUMENTS

CN      1299884 A       6/2001
CN    107473242 A      12/2017
(Continued)

OTHER PUBLICATIONS

Zhang L et al "A study of the international of Li2O and y-Alumina"; Journal of Solid State Chemistry 97, 292-298 (1992).
(Continued)

*Primary Examiner* — Yun Qian
(74) *Attorney, Agent, or Firm* — Fox Rothschild LLP

(57) ABSTRACT

A process and system are disclosed for producing lithium oxide from lithium nitrate. In the process and system, the lithium nitrate is thermally decomposed in a manner such that a fraction of the lithium nitrate forms lithium oxide, and such that a remaining fraction of the lithium nitrate does not decompose to lithium oxide. The thermal decomposition may be terminated after a determined time period to ensure that there is a remaining fraction of lithium nitrate and to thereby produce a lithium oxide in lithium nitrate product. The lithium oxide in lithium nitrate product may have one or more transition-metal oxides, hydroxides, carbonates or nitrates added thereto to form a battery electrode. The lithium oxide in lithium nitrate product may alternatively be subjected to carbothermal reduction to produce lithium metal.

19 Claims, 4 Drawing Sheets

Total Process

(51) Int. Cl.
    *B01J 19/00*      (2006.01)
    *B01J 19/18*      (2006.01)
    *C01B 21/40*      (2006.01)
    *C01D 15/10*      (2006.01)

(52) U.S. Cl.
    CPC .............. *C01B 21/40* (2013.01); *C01D 15/10* (2013.01); *B01J 2219/0004* (2013.01); *B01J 2219/00083* (2013.01)

(56) References Cited

U.S. PATENT DOCUMENTS

| | | |
|---|---|---|
| 5,350,717 A | 9/1994 | Day et al. |
| 2015/0325837 A1 | 11/2015 | Xia |

FOREIGN PATENT DOCUMENTS

| | | |
|---|---|---|
| CN | 108431253 A | 8/2018 |
| EP | 3394302 A1 | 10/2018 |
| GB | 402977 A | 12/1933 |
| JP | H024442 A | 1/1990 |
| JP | H09326255 A | 12/1997 |
| WO | 98/13297 A1 | 4/1998 |
| WO | 2011/082444 A1 | 7/2011 |
| WO | 2012/126092 A1 | 9/2012 |
| WO | 2013/140039 A1 | 9/2013 |
| WO | 2014/026217 A1 | 2/2014 |
| WO | 2015/123762 A1 | 8/2015 |
| WO | 2015/155684 A2 | 10/2015 |
| WO | 2017/106925 A1 | 6/2017 |

OTHER PUBLICATIONS

Extended European Search Report issued on Aug. 4, 2022 in EP application No. 19888266.
Chinese Office Action dated Nov. 14, 2022 issued in CN 1082800919.
Kudryavtsev, P., "Lithium in nature, application, methods of extraction (review)", 2016, Journal Scientific Israel—Technological Advances, vol. 18, No. 3, pp. 63-83.
International Search Report for International Application No. PCT/AU2019/051308, mailed Feb. 12, 2020, 5 pages.
"Xinjiang's Gems and Jades", Hanchen YANG, et al., Volksverlag Xinjiang, p. 56, published on Jan. 31, 2012.
"Deep processing of metals and mineral products", mainly compiled by Yongnian Dai, Metallurgical industry press, pp. 33-34.
"Study on extraction of lithium metal by vacuum smelting", written by Bin Yang & Yongnian Dai, Yunnan Science and Technology Press, pp. 91-92.
"Engineering research method and testing technology", Zuyuan Qu, Wuhan Industrial University Press, pp. 231-233, published May 1995.
"Atomic Energy Industry", Peisheng Lian, Atomic Energy Press, May 2002, pp. 244-245.
"Oil and Gas Gathering and Transportation and Mine Processing" (2nd edition), Shuchu Feng, et al., China University of Petroleum Press, May 2006, pp. 484-485.
New Energy Technologies and Applications (published Feb. 28, 2007), 1 page.
Introduction to Rare Metal Metallurgy (published Aug. 31, 1961) 1 page.
Chemical Encyclopedia (vol. 10) Air Conditioning-Chlorinated Alcohols (published Apr. 30, 1996) 2 pages.

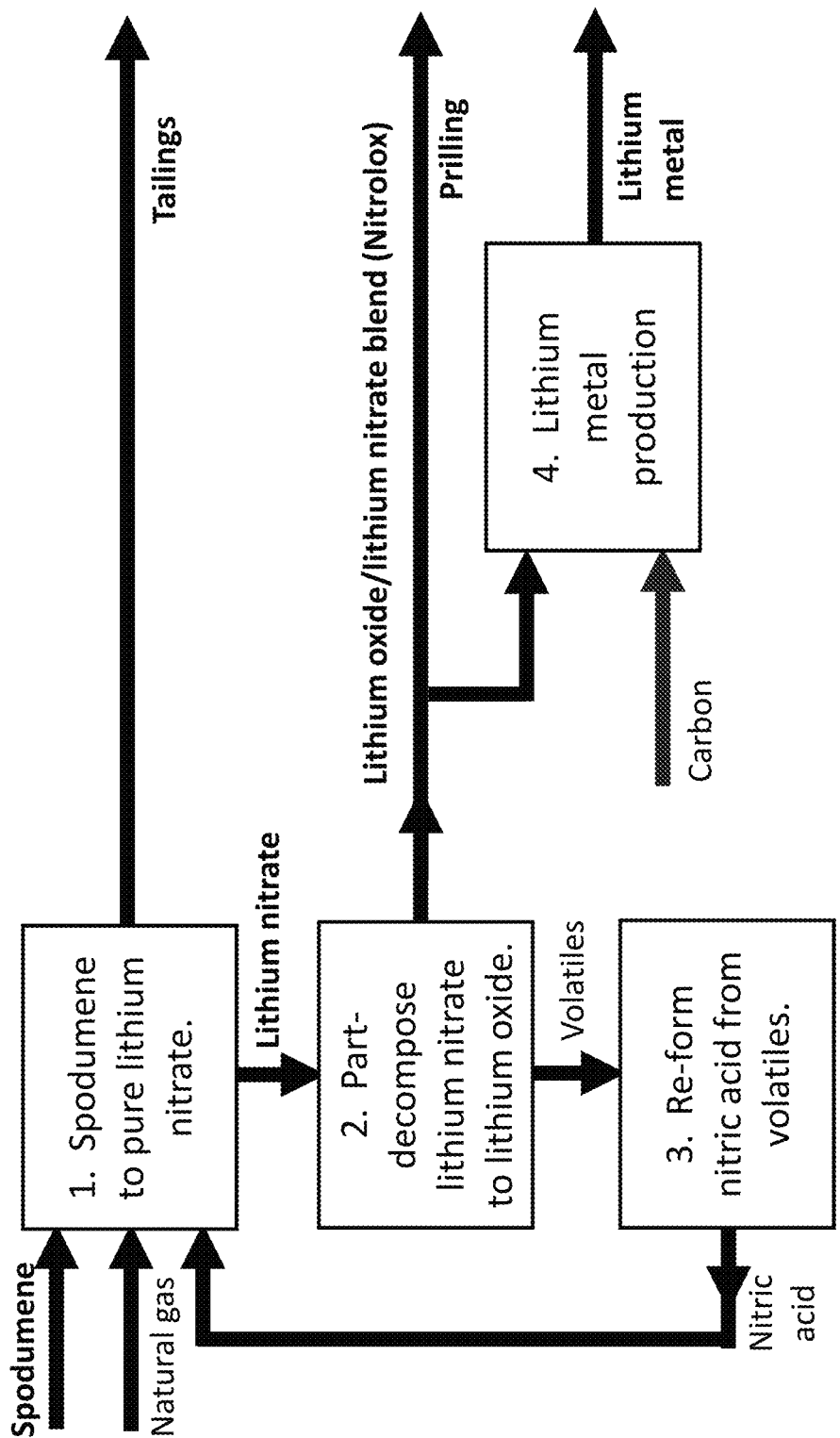
Figure 1. Total Process

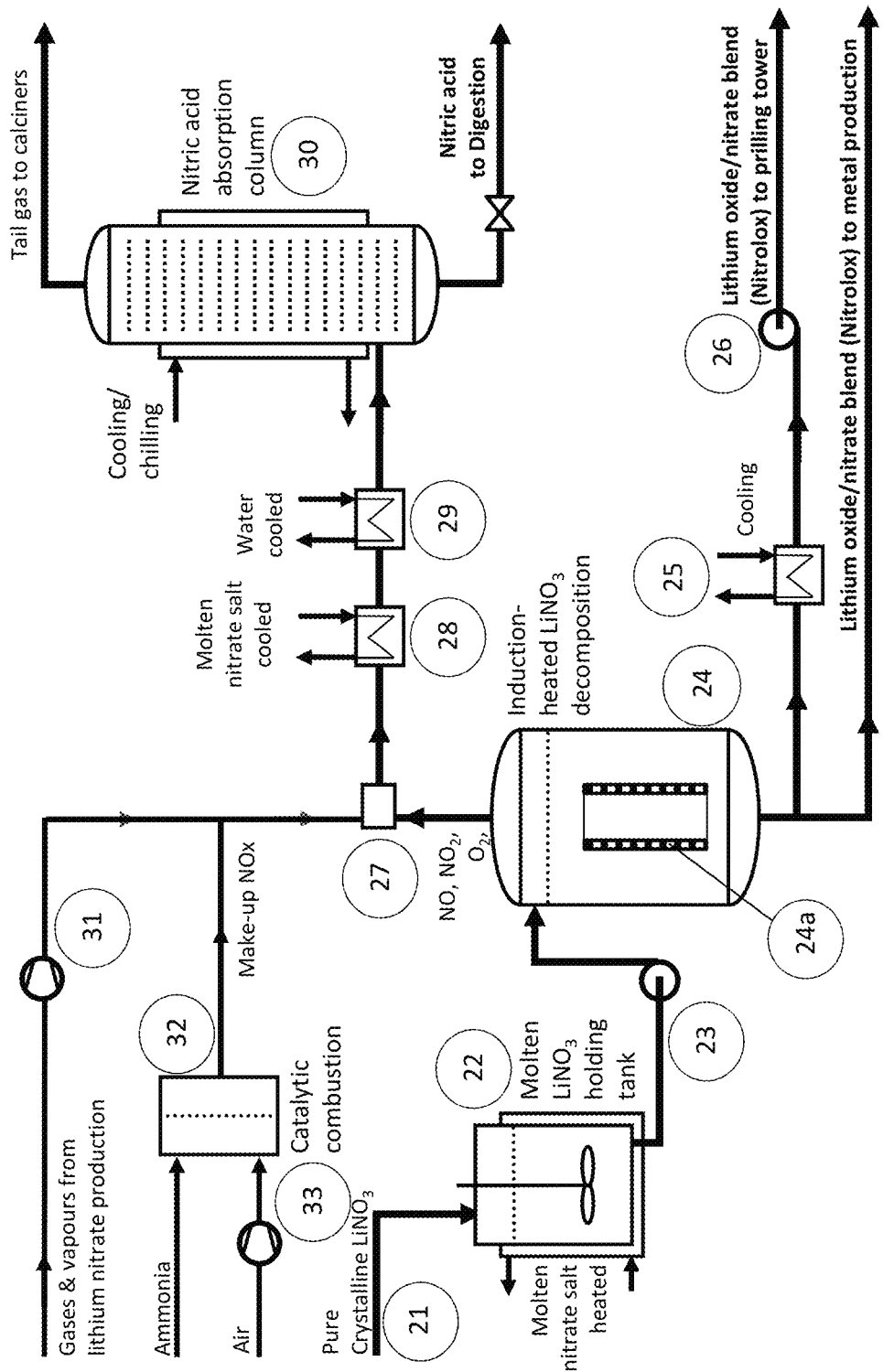
Figure 2. Lithium oxide production and nitric acid recycle

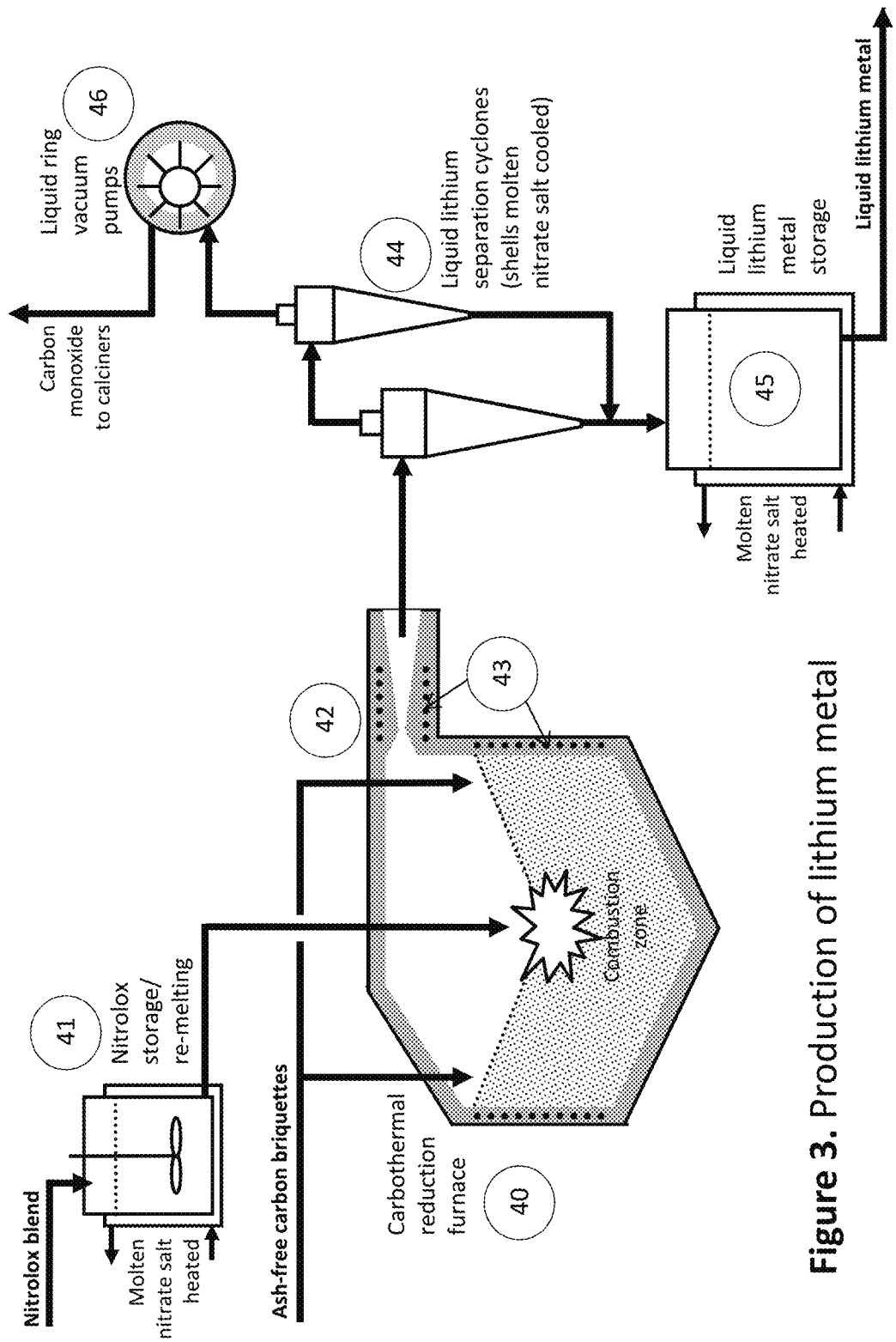
Figure 3. Production of lithium metal

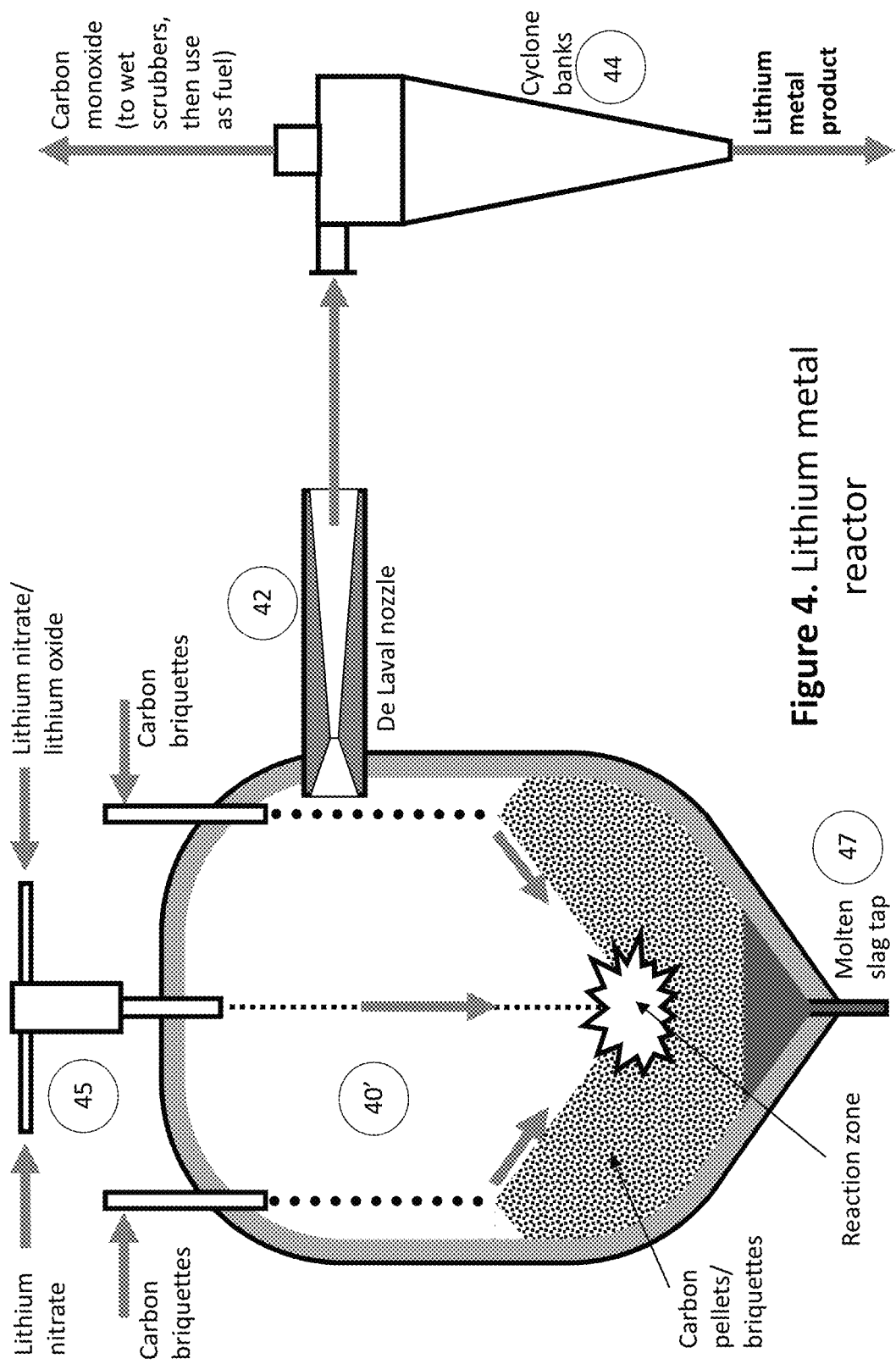
Figure 4. Lithium metal reactor

PRODUCTION OF LITHIUM CHEMICALS AND METALLIC LITHIUM

CROSS-REFERENCES TO RELATED APPLICATIONS

This application is a U.S. national phase application, pursuant to 35 U.S.C. § 371, of PCT/AU2019/051308, filed Nov. 29, 2019, designating the United States, which claims priority to Australian Application No. 2018904540, filed Nov. 29, 2018. The entire contents of the aforementioned patent applications are incorporated herein by this reference.

TECHNICAL FIELD

A process, system and apparatus are described for producing a range of lithium chemicals as well as lithium metal. The products of such a process, system and apparatus may have advantages for the manufacture of, in particular, lithium batteries. The lithium metal produced may also be employed for alloying purposes (e.g. in lithium-aluminium alloys for use in aerospace industries and other applications).

BACKGROUND

The market price of lithium batteries suitable for larger electricity storage applications, such as electric vehicles (EVs), and the storage of renewable energy as generated by e.g. rooftop photovoltaic (PV) panels, has fallen by as much as 80 percent over the period 2012 to 2018, from an upper price of around US$1,000/kWh of effective storage capacity. Meanwhile, the capacity of lithium batteries to store electricity per kilogram of battery weight (in kWh/kg), and the rates the batteries are capable of receiving and delivering power (charging and discharging, in kW/kg), continue to increase, albeit more slowly.

Investment worldwide in many of the value-adding operations from prospecting for new lithium resources to the final assembly of complete battery packs (which may contain many thousands of individual lithium cells) are increasing rapidly, in response to projections for the adoption of storage systems to allow the electrification of road transport, and for the storage of renewable energy systems to allow their output to be dispatched in response to demand. But this growth is to some extent underwritten by an acceptance that the cost of lithium batteries will continue to fall, and that they will continue to improve in terms of their lifetime, charge/discharge rates and efficiency, storage capacity and safety.

Recovering lithium values in a form suitable for use in the manufacture of lithium batteries presents challenges of cost and environmental impact that can combine to slow their deployment and the benign applications anticipated for them. Whilst a number of the value-adding operations, including the afore-mentioned prospecting for lithium mineralisation and assembly of complete battery packs, have been subject to improvements that reduce their costs and/or environmental impacts, there has been less focus on improvements to the processing operations that convert lithium-containing minerals into lithium chemicals that are suitable for the manufacture of lithium batteries.

Arguably the most important components of lithium batteries, and also the most amenable to reductions in costs, are their two terminals, namely, the positive (cathode) and negative (anode), the cathode in particular. Current generations of lithium batteries generally have cathodes that comprise compounds of lithium, various transition metals and oxygen. Earlier high-performance lithium batteries had chemistries where only one transition metal was used, namely, cobalt (so-called LCO batteries—i.e. for lithium cobalt oxide).

More recently, lithium batteries have been developed such as LMN (i.e. lithium manganese nickel oxide), NMC (lithium nickel manganese cobalt oxide), etc. (i.e. batteries comprising cathodes formed from compounds with formulae $LiMO_2$ and $Li_2M'O_3$, where M is a transition metal with an oxidation state of +3, and M' is a transition metal with an oxidation state of +4). Thus, battery manufacturers are attempting to substitute cobalt in part or in full with more abundant transition metals such as iron, nickel, manganese, titanium etc., because cobalt is relatively scarce, hence expensive, and LCO batteries are also prone to fires.

For example, US 2009/0212267 discloses the production from precursor materials of small particles such as lithium-based compounds (e.g. $LiFePO_4$, $LiMnPO_4$, $LiFeMnPO_4$, $LiMnNiO_2$, $Li_4Ti_5O_{12}$) having sizes in the order of microns/nanometres. The resultant small particles are used as electrode materials in electrochemical cells including batteries.

To make these compounds, oxides of the transition metals and (in the first instance) lithium carbonate, but increasingly lithium hydroxide (as the monohydrate), are mixed together in the desired proportions and cooked for many hours at high temperatures (800-900° C.), with the resulting solid being ground to a very fine powder, which powder is then coated (printed) onto thin copper foil to form the cathode.

A primary source of lithium for such compounds comprises spodumene and other lithium-rich metal silicate minerals. The present inventor has patented (e.g. U.S. Pat. No. 10,131,968, CN 106906359, both derived from WO2017/106925) an improved process for recovering lithium from silicate minerals and for producing lithium carbonate and lithium hydroxide. The process represents an improvement over art that is more than half a century old. The relevant contents of WO2017/106925 are incorporated herein by reference.

The process of WO2017/106925 is 'closed' insofar as concerns the major chemical used in the process, namely, nitric acid. In the process of WO2017/106925, the nitric acid used in the process may be recovered and reconstituted for re-use. WO2017/106925 also describes how lithium nitrate formed may be thermally decomposed to yield lithium oxide and oxides of nitrogen, and how nitric acid may be re-formed from the oxides of nitrogen for re-use in the process. However, in the process of WO2017/106925, lithium oxide is only formed as an intermediate, on the way to producing lithium carbonate, lithium hydroxide and lithium metal (i.e. because each of lithium carbonate and lithium hydroxide are the industry-specified chemicals for the manufacture of lithium batteries), and because lithium oxide is a difficult material to process in battery manufacture. Further, in the process of WO2017/106925, as much lithium oxide as possible is formed, i.e. to maximise the amount of each of lithium carbonate and lithium hydroxide that are formed. In addition, lithium oxide is not conveniently produced using any of the other currently known processes for refining lithium ores.

A reference herein to the background or prior art does not constitute an admission that such art forms part of the common and/or general knowledge of a person of ordinary skill in the art. Such a reference is not intended in any way to limit the process and system as set forth herein.

SUMMARY OF THE DISCLOSURE

Disclosed herein is a process for producing lithium oxide from lithium nitrate. The lithium nitrate may in turn be produced from the principal classes of naturally-occurring lithium-rich minerals, namely, metal silicates (including micas and clays) and brines. For example, the lithium nitrate may be produced by a process as set forth in WO2017/106925 (i.e. U.S. Pat. No. 10,131,968 and CN 106906359).

The present process comprises thermally decomposing the lithium nitrate such that a fraction thereof forms lithium oxide, and such that a remaining fraction of the lithium nitrate does not decompose to lithium oxide. In other words, the process as disclosed herein is controlled such that only part of the lithium nitrate decomposes to lithium oxide. Thus, the product of the present process is a blend of lithium nitrate and lithium oxide. The process is terminated after a determined time period to ensure that a fraction of the lithium nitrate remains and to thereby produce a lithium oxide in lithium nitrate product.

The present process contrasts with the process disclosed in WO2017/106925 in which the products are lithium hydroxide, lithium carbonate and lithium metal. The present process is deliberately intended to produce a fraction of lithium oxide (lithia) in the product. The applicant has appreciated that lithium oxide has a high proportion of lithium (e.g. in comparison to lithium hydroxide and lithium carbonate). However, as mentioned above, lithium oxide is a difficult product to deal with as an ingredient for the manufacture of lithium battery cathodes. In this regard, lithium oxide is highly refractory. Thus, to employ it as a starting material in the manufacture of e.g. lithium battery cathode materials (compounds of lithium with transition metal oxides) would require severe conditions (i.e. high temperatures and long heating times). In addition, to be able to produce 100% lithium oxide as a fed material would require a complicated processing plant (i.e. existing facilities at lithium refineries are not suitable for this purpose). For this reason, lithium oxide has not been employed as an ingredient for the manufacture of, inter alia, lithium battery cathodes. For all these reasons, existing lithium refineries do not aim to produce lithium oxide.

The present process also contrasts with the methods disclosed in US 2009/0212267. US 2009/0212267 does not disclose or relate to the thermal decomposition of lithium nitrate to form lithium oxide, let alone to the thermal decomposition of just a fraction of the lithium nitrate to form lithium oxide (i.e. so that a remaining fraction of the lithium nitrate does not decompose to lithium oxide). Further, US 2009/0212267 makes no attempt to distinguish lithium nitrate from a long list of lithium salts recited therein as precursor materials. In this regard, US 2009/0212267 does not in any way identify the unique properties of lithium nitrate, such as the lithium nitrate salt melting at a relatively low temperature of 260° C., meaning that it can host solid lithium oxide that is formed from the decomposed fraction. Rather, the focus of US 2009/0212267 is on the grinding of precursors to extreme fineness using particular grinding media, for their subsequent formation into battery electrodes.

On the other hand, the present inventor has surprisingly discovered that a blend of lithium oxide with lithium nitrate can be a suitable ingredient for battery manufacture, as well as for lithium metal production. For example, at temperatures above the melting point of lithium nitrate (i.e. above ~260° C.), a slurry or paste of lithium oxide in molten lithium nitrate can be produced. If this slurry is maintained at a temperature above the lithium nitrate melting point, it may (e.g. in a processing setting) be transported conveniently using appropriate pumps and pipelines. Then, when the slurry is cooled to below the lithium nitrate melting point (e.g. in a handling, transport and storage setting), the lithium oxide in lithium nitrate product may be suitably formed into (or the product may suitably take form as) prills, pellets, flakes, etc.

After being formed into and transported as e.g. prills, etc., a battery manufacturer is merely required to heat the lithium oxide in lithium nitrate product until the lithium nitrate phase softens (i.e. above ~260° C.). This can e.g. form a molten $LiNO_3$ salt bath that comprises solid lithium oxide crystals dispersed therein, and to which bath the transition-metal oxides hydroxides, carbonates or nitrates (e.g. as powders) can be added, along with any other required electrode materials. The resultant mixture can thereafter be further heat treated by the manufacturer in production of the electrode. The present inventor has surprisingly discovered that battery cathode materials may be formed from the lithium oxide in lithium nitrate product under modest conditions (i.e. requiring less time and lower temperatures than the many hours and high temperatures (800-900° C.) typically required). In this way, the present inventor has devised a way that lithium oxide can readily be used as a starter material for e.g. battery manufacturing. As mentioned above, lithium oxide has the added benefit of comprising a relatively high proportion of lithium.

In an embodiment, the fraction of lithium nitrate that is thermally decomposed to lithium oxide may be about 50-90% of the lithium nitrate prior to thermal decomposition. More specifically, the fraction of lithium nitrate that is thermally decomposed may be about 70-90%. With this degree of conversion, the resultant hot slurry (i.e. which is at a temperature above the melting point of lithium nitrate) can flow readily.

A figure of 90% of lithium nitrate being thermally decomposed can represent a high degree of conversion to the oxide and can also result in the recycling of up to 90% of nitric acid (plus any nitric acid make up for losses) produced as a part of the process. In practice, it is possible to tailor the proportions of $Li_2O$ and $LiNO_3$ to whatever an end-user may require (e.g. a battery manufacturer). For example, a 50:50 blend by weight of $LiNO_3$ and $Li_2O$ can result when 75% of the $LiNO_3$ is decomposed to $Li_2O$.

By way of further example, if e.g. 90% of the lithium nitrate is thermally decomposed to lithium oxide, this produces a paste comprised of 66% $Li_2O$ (solid crystals) and 34% $LiNO_3$ (liquid) by weight, with 34.5% of the total by weight comprising Li. In contrast, the typical battery manufacture feed materials, namely, lithium carbonate and lithium hydroxide monohydrate comprise Li at 19 wt. % and 16.7 wt. % respectively. Thus, an overall higher proportion of Li can be delivered to e.g. a battery manufacturer by the process as disclosed herein.

In an embodiment, prior to thermal decomposition, the lithium nitrate may be heated in a separate pre-heating stage so as to form molten lithium nitrate salt. The molten lithium nitrate salt may then be passed to the thermal decomposition stage, which latter stage can be separate to the pre-heating stage. The lithium nitrate (e.g. crystals) may even begin to partially convert to lithium oxide in the pre-heating stage. The pre-heating stage may comprise a melting (e.g. heat exchanger) vessel in which the lithium nitrate (e.g. crystals) may be heated to around 400° C. (e.g. by heat exchange with hot process streams). This heating can transform the lithium nitrate into a clear and highly fluid (i.e. mobile) molten salt. When in the form of a molten salt, the lithium nitrate is electrically conductive which means that it may then be thermally decomposed using electrical induction. The separate thermal decomposition stage may thus receive the molten lithium nitrate and cause it to further decompose by (i.e. more aggressive) heating, at temperatures greater than the lithium nitrate decomposition temperature (i.e. greater than ~600° C.). Employing two stages in series can result in better process economics because, typically, the thermal decomposition stage requires electrical induction heating, which tends to be expensive, whereas the separate pre-heating stage can make use of hot process streams and can thus pre-heat the lithium nitrate (e.g. to 400° C.). Thus, less electrical energy can be required to heat the lithium nitrate to above its decomposition temperature (i.e. >~600° C.).

In an embodiment, the thermal decomposition of the lithium nitrate may comprise direct or indirect heating of the lithium nitrate. The heating may take place at a pressure equal to or greater than ambient/atmospheric (e.g. up to and including pressures as high as 9 Bar gauge).

In one form, the direct heating may take the form of induction heating (e.g. via electrically powered induction coils arranged within a thermal decomposition reactor that are operated to decompose the lithium nitrate to a desired extent).

In another form, the lithium nitrate may be decomposed in a vessel that is indirectly (externally) heated—i.e. to decompose the lithium nitrate as desired, and to a desired extent.

In the course of such direct or indirect (e.g. induction or external) heating, care can be taken to avoid contact between the contents of the vessel and any gases, including the atmosphere. Where a fuel is burned to provide the required external heat to decompose the lithium nitrate, care can also be taken to avoid contact between the contents of the vessel and the products of combustion of the fuel.

As set forth above, the lithium nitrate thermally decomposes at a temperature greater than about 600° C. In an embodiment, termination of the thermal decomposition of lithium nitrate may be achieved simply by cooling the partially decomposed product to below its decomposition temperature of ~600° C. Thereafter, when the lithium oxide in lithium nitrate product is maintained at temperatures between ~260° C. and ~600° C., the product may take the form of a paste or slurry that comprises solid lithium oxide in molten lithium nitrate. This paste/slurry may then be transferred within the process (e.g. by suitable pumps, piping, conveyors, etc.). Thereafter, the paste/slurry may be further cooled to a temperature of less than ~260° C. to produce a solid lithium oxide in lithium nitrate product. For example, and as set forth above, the resultant solid product may be produced in the form of prills, pellets, flakes, or the like.

When, for example, the resultant solid product is made into prills, this may be performed in a prilling column. The prilling column may be filled with air devoid of water vapour and carbon dioxide (i.e. so as not to react with the prills). The resultant prills may be packed in sealed containers or may be handled in bulk, and can be no more difficult to handle than e.g. flake caustic soda. Thus, the solid lithium oxide in lithium nitrate product can be readily transported, etc.

When, for example, the resultant solid product is made into flakes, like caustic soda, the solid lithium oxide in molten lithium nitrate (i.e. hot slurry/paste) may be coated on the external surfaces of a cooled drum. The resultant cooled, solid product may then be lifted off the face of the drum by e.g. a doctor blade to form the flake product.

A battery manufacturer is merely required to heat the prills, flakes, pellets, etc. until the lithium nitrate phase softens, then add the transition-metal oxides, hydroxides, carbonates or nitrates (as powders) and anything else required, and then heat the resultant mixture as required to produce the electrode feed material. Thus, the solid lithium oxide in lithium nitrate product represents an ideal feed material for battery electrode production.

In an embodiment, the thermal decomposition may also produce oxygen and oxides of nitrogen (i.e. as a by-product stream). These gases may be collected and e.g. passed to a nitric acid production stage (i.e. to generate nitric acid). In the nitric acid production stage, the oxides of nitrogen and oxygen may be absorbed into aqueous solution to form nitric acid in a known manner. Thus, nitric acid can be 'reclaimed' from the process. Further, the capture and use of such by-product gases can contribute to the present process being 'closed' insofar as nitric acid is concerned.

In an embodiment, to account for any losses of nitric oxide, etc., a make-up stage can be provided. In the make-up stage, oxides of nitrogen can be produced by the catalysed burning of ammonia in an excess of air (i.e. as practised widely at industrial scale by way of the Ostwald Process). The resultant gaseous stream from the catalysed burning may be collected and passed to the nitric acid production stage for generating further nitric acid. This can further contribute to the present process being 'closed' insofar as nitric acid is concerned.

In an embodiment, the nitric acid produced by the nitric acid production stage may be employed in a stage that is located prior to the thermal decomposition stage. For example, in the pre-thermal decomposition stage, the nitric acid may be mixed with a lithium-containing silicate mineral (e.g. typically an activated lithium ore such as spodumene or other lithium-rich metal silicate mineral). This mixture may then be subjected to a leaching stage in which lithium values in the silicate mineral are leached from the silicate mineral as lithium nitrate. The lithium nitrate may be separated, and may then be subjected to the afore-mentioned thermal decomposition process to form the lithium oxide in lithium nitrate product. Thus, in a similar manner to the process of WO2017/106925, the present process can again be considered 'closed' insofar as nitric acid is concerned.

In an embodiment, the process may further comprise a crystallisation stage in which a solution of lithium nitrate produced by the leaching stage is concentrated and crystallised to form relatively pure crystalline $LiNO_3$. This crystallised $LiNO_3$ may be separated from solution, such as by centrifugation. The separated crystalline $LiNO_3$ may then be subjected to the thermal decomposition process to form the lithium oxide in lithium nitrate product.

In a process variation, some or all of the lithium oxide in lithium nitrate product of thermal decomposition may be converted to lithium metal, such as by a reduction process. In this regard, the lithium oxide in lithium nitrate product of thermal decomposition may be passed hot to the reduction process (i.e. with no interim cooling). The lithium metal product of the reduction process can represent an economically more advantageous product, in that it has applications beyond battery manufacture, such as in high-tech/advanced alloys (e.g. for use in aerospace applications).

In an embodiment of this process variation, the reduction process may comprise heating the lithium oxide in lithium nitrate product along with a source of carbon (e.g. ash-free carbon briquettes) to a temperature sufficient to initiate the reaction between the lithium nitrate and carbon. In this regard, the reaction between lithium nitrate and carbon is noted to be highly exothermic; it is essentially a reaction on the same basis as gunpowder (i.e. where potassium nitrate rather than lithium nitrate is used). Typically, the temperature of this reaction is sufficient to cause lithium in both the lithium nitrate and lithium oxide to be reduced to lithium metal whilst the carbon source is oxidised into gaseous form.

Whilst the reaction between the lithium nitrate and carbon may be initiated, a proportion of the ongoing heat for the reduction process can come from the lithium nitrate component of the blended product continuing to react with the source of carbon (i.e. as it is passed directly into the reduction process). Thus, in the reduction process, the lithium nitrate and carbon reaction and the lithium oxide reduction reaction can occur in parallel. As above, the former reaction is strongly exothermic, whereas the latter reaction is strongly endothermic.

In this regard, the proportions of lithium nitrate and lithium oxide in the product of thermal decomposition may be controlled so that some of the heat energy required to drive the reaction for production of lithium metal may be provided by the reaction between lithium nitrate and the source of carbon.

In an embodiment of this process variation, immediately following reduction to lithium, the lithium metal as vapour and the gaseous oxidised carbon may be cooled so rapidly that any tendencies for the reaction to reverse (i.e. for lithium metal to oxidise to lithium oxide, and for the gaseous oxidised carbon to re-form elemental carbon) are forestalled. For example, to prevent reversal of the reaction that formed the lithium metal vapour and the gaseous oxidised carbon, the blend of vapours may be rapidly cooled by supersonic expansion, such as by passing them through a convergent-divergent (de Laval) nozzle. Supersonic expansion is obtained by maintaining an adequate pressure differential between the inlet and discharge of the de Laval Nozzle.

In an embodiment of this process variation, the temperature of the gas exhausting the de Laval nozzle can be below the boiling temperature of lithium metal, causing the lithium metal to condense into fine droplets dispersed through the oxidised-carbon gas. This allows the resultant liquid lithium metal and gaseous oxidised-carbon to be separated from one another. For example, the liquid lithium metal and gaseous oxidised-carbon may be passed through a cyclone separation stage. The cyclone separation stage produces a liquid lithium metal product which may be further cooled to a solid and safely stored. The solid lithium metal product may be safely stored at ambient temperatures, provided that it is contained in an air-tight container, or otherwise prevented from contacting air or moisture (e.g. by storing it under a non-aqueous liquid such as oil). The separated gaseous oxidised carbon may also be captured and reused as a fuel, such as for the calcination of concentrates of the lithium-rich silicate mineral spodumene—an original feed material to the process (e.g. where the gaseous oxidised carbon produced is carbon monoxide, this can be burned in air to release energy and produce carbon dioxide).

In an alternative embodiment, the source of lithium nitrate for the thermal decomposition process may comprise a salar (e.g. a brine such as from the salt lakes of South America—e.g. from the lakes of the "Lithium Triangle" in Argentina, Bolivia and Chile).

In this alternative embodiment, the lithium nitrate from the salar may be produced by taking a lithium-rich brine, in particular lithium chloride—LiCl, from a salar-treatment stage and adding a nitrate salt, such as Chile saltpetre ($NaNO_3$), thereto. The resulting mixture may then be subjected to a thermal treatment stage, such as evaporation, to produce a solution of lithium nitrate.

In this alternative embodiment, the thermal treatment of the lithium-rich brine and nitrate salt mixture may be such as to cause common salt (NaCl) to precipitate from the solution, to thereby produce the lithium nitrate solution. This solution can then form the basis of producing a lithium nitrate feedstock for the thermal decomposition stage.

Also disclosed herein is a reduction process for producing lithium metal from lithium nitrate. The reduction process comprises heating the lithium nitrate along with a source of carbon (e.g. ash-free carbon briquettes) to a temperature sufficient to initiate a reaction between the lithium nitrate and carbon, whereby lithium is caused to be reduced to lithium metal and the carbon source is oxidised into gaseous form.

Advantageously, and as set forth above, a proportion of the thermal energy required to maintain a temperature that is sufficiently high enough to cause lithium to be reduced to lithium metal may be contributed by the strongly exothermic reaction between lithium nitrate and carbon. For example, the strongly exothermic reaction between lithium nitrate and carbon may give rise to temperatures of at least 1,500° C. (and perhaps as much as 2,000° C.). At these temperatures, the lithium in the feed material will be reduced to lithium metal.

In an embodiment, the lithium nitrate that is heated may be present in a mixture of lithium nitrate and lithium oxide. This mixture may be the product of the thermal decomposition process as set forth above. This mixture may be fed as a hot paste/slurry to the lithium reduction process. Again, a proportion of the thermal energy required to maintain the required high temperatures to cause lithium oxide to reduce to lithium metal may be contributed by the strongly exothermic reaction between the lithium nitrate component of the blend and carbon.

In an embodiment, immediately following reduction, the lithium metal as vapour and the gaseous oxidised carbon (as well as any nitrogen gas from the reaction between lithium nitrate and carbon) may be rapidly cooled so as to form liquid lithium metal and by-product gases. For example, the lithium metal vapour and the gaseous oxidised carbon, etc. may be rapidly cooled by expansion, such as by supersonic expansion through a convergent-divergent (de Laval) nozzle.

The resultant liquid lithium metal and gaseous oxidised carbon, etc. may be separated from one another, such as by passing them through a cyclone separation stage (e.g. two cyclone separators in series). The gaseous oxidised carbon (e.g. carbon monoxide) may be optionally captured and reused as a fuel.

Also disclosed herein is a system for producing lithium oxide from lithium nitrate. The system comprises a thermal decomposition reactor which is configured such that a fraction of the lithium nitrate is able to be thermally decomposed therein to form lithium oxide and such that a remaining fraction of the lithium nitrate is not decomposed to lithium oxide.

In an embodiment, the thermal decomposition reactor may comprise a tank reactor (optionally, a pressure vessel). The tank reactor may be arranged such that molten lithium nitrate can be added into a top of the tank reactor. The tank reactor may be further arranged such that a slurry of lithium nitrate containing lithium oxide is able to be withdrawn from a bottom of the tank reactor. Additionally, the tank reactor may be arranged to provide a gas space above the slurry, and into which gas space oxides of nitrogen and oxygen from the decomposition of the lithium nitrate may be collected and drawn off.

Typically, the tank reactor is configured to be heated to a temperature in excess of about 600° C. (i.e. above the decomposition temperature of lithium nitrate). This heating may be direct or indirect heating.

For example, an induction heating coil may be located within the tank reactor to directly heat the contents thereof. In this regard, molten lithium nitrate is electrically conductive which means that it may be heated using electrical induction.

In another example, the reactor may be externally heated such as by burning a fuel using fuel burners arranged to externally heat the reactor.

Contents of the tank reactor may be caused to be stirred by natural circulation caused by the action of e.g. the electrical induction heating coil. In the case of the externally heated reactor, the contents may be stirred by a suitable impeller.

In a variation, the tank reactor may take the form of a pressure vessel to be operated at a pressure in excess of ambient. For example, the reactor may be configured to operate at pressures up to about 9 Bar gauge (10 Bar absolute pressure). At these temperatures and pressures, a typical product of the tank reactor can comprise solid crystals of lithium oxide in lithium nitrate liquid.

In an embodiment, the system may further comprise a pre-heating (e.g. heat exchanger) vessel. The pre-heating vessel may optionally be stirred. In the pre-heating vessel the lithium nitrate (e.g. an anhydrous and relatively pure crystalline form thereof) may be heated to above its melting temperature of ~260° C. Optimally, the lithium nitrate may be heated to around 400° C. At this temperature, the lithium nitrate becomes highly mobile and highly electrically conductive, such that it can be in an optimal form for transfer directly to the thermal decomposition reactor to form the lithium oxide in lithium nitrate product. As set forth above, employing a pre-heating vessel can result in better process economics because, typically, the thermal decomposition reactor requires electrical induction heating or fuel-fired external burners, each of which tends to be expensive, whereas the separate pre-heating vessel can make use of hot process streams to pre-heat and melt the lithium nitrate.

When the tank reactor takes the form of a pressure vessel, the pressure of the molten lithium nitrate from the pre-heating vessel may be increased (e.g. up to about 9 Bar gauge) by a suitable pump, prior to it being passed to the thermal decomposition reactor.

In an embodiment, the system may further comprise a nitric acid production reactor (e.g. a known absorption column/tower, or a compact heat exchanger-absorber, etc.). The oxides of nitrogen and oxygen that are drawn off from the thermal decomposition reactor may be passed to the nitric acid production reactor where they may be absorbed into aqueous solution to form nitric acid in a known manner. When the thermal decomposition reactor takes the form of a pressure vessel, the system may be arranged such that the captured gases are able to flow under pressure to the nitric acid production reactor.

In an embodiment, the system may further comprise a leaching reactor (e.g. a pressure leaching vessel such as an autoclave). In the leaching reactor, the nitric acid produced by the nitric acid production reactor may be mixed with a lithium-containing silicate mineral (e.g. an activated, β-form of a silicate ore such as spodumene). In the leaching reactor, the lithium values in the silicate mineral may be leached from the silicate mineral as lithium nitrate. The lithium nitrate may be separated (e.g. in a filtration stage) and can then be passed to the thermal decomposition reactor to form the lithium oxide (i.e. the lithium oxide in lithium nitrate product).

In an embodiment, the system may further comprise a crystalliser. The crystalliser may be arranged to receive a solution of lithium nitrate produced by the leaching stage and to concentrate and then crystallise that solution to form relatively pure, anhydrous crystalline $LiNO_3$. The system may also comprise a separator (e.g. a centrifuge). In the separator, the crystallised $LiNO_3$ may be separated from the solution, with the separated crystalline $LiNO_3$ then being passed to the thermal decomposition reactor (or to the pre-heating vessel) to enable formation of the lithium oxide in lithium nitrate product.

In an embodiment, the system may further comprise a combustor. The combustor may take the form of a pressurised catalytic combustor. In the combustor, ammonia may be burned in an excess of air. The gaseous product stream from the combustor (oxides of nitrogen) may be collected and passed to the nitric acid production reactor. The combustor can thus provide for make-up nitric acid (i.e. to account for system losses).

In an embodiment, the system may further comprise a reduction furnace in which a slurry that comprises solid crystals of lithium oxide in lithium nitrate liquid from the thermal decomposition reactor may be mixed with a source of carbon (e.g. ash-free carbon briquettes). To assist with reaction control, the carbon may be fed around a periphery of the reduction furnace, whereas the lithium oxide in lithium nitrate slurry may be centrally fed from above the reduction furnace. The peripheral carbon may form a reaction bed within the furnace that slopes down to a central reaction zone. In the reduction furnace the blend may be caused to be heated (e.g. centrally within the furnace) so as to convert the slurry to lithium metal (i.e. gaseous lithium metal). A portion of the heat for the reduction furnace may come from the feed materials themselves (i.e. by way of the reaction between lithium nitrate and carbon).

In an embodiment, the slurry may be pre-heated in a holding vessel prior to being fed into the reduction furnace. Such pre-heating can make use of hot process streams, but can also cause the lithium oxide in lithium nitrate slurry to be in a more optimised form for feeding into the reduction furnace.

In an embodiment, the system may further comprise a blending vessel in which the proportions of lithium nitrate and lithium oxide in the product of thermal decomposition may be controlled. In this regard, additional lithium nitrate may be added to the blending vessel to be blended with the lithium oxide in lithium nitrate product, prior to the blend being fed into the reduction furnace. The blend may be optimised so that some of the heat energy required to drive the reduction reaction to lithium metal can be provided by the reaction between lithium nitrate and the source of carbon.

In an embodiment, the system may further comprise a flash-cooling apparatus. The flash-cooling apparatus may take the form of a convergent-divergent (de Laval) nozzle. The convergent-divergent nozzle may be located at e.g. an upper exit of the reduction furnace. The lithium metal product (i.e. in gaseous form) can flow from the upper exit of the reduction furnace to pass through the de Laval nozzle and be rapidly cooled thereby (e.g. by supersonic expansion). In doing so, the gaseous lithium metal can thereby form molten lithium metal.

In an embodiment, the system may further comprise a separation apparatus. The separation apparatus may take the form of one or more cyclones. In the separation apparatus the molten lithium metal can be separated from gases produced in the reduction furnace during the conversion to lithium metal (e.g. oxides of carbon, primarily CO, nitrogen, etc.). The separated molten lithium metal can be stored in an optionally heated storage vessel (e.g. a jacketed tank), whereas the separated gases (e.g. the oxides of carbon) may be recycled and e.g. burned in a stage prior to the thermal decomposition reactor. For example, carbon monoxide may be employed in the calcining of a lithium-containing silicate mineral (i.e. to thereby produce an activated, β-form thereof, ready for leaching with nitric acid).

Also disclosed herein is a reduction furnace for the production of lithium metal. The furnace is arranged to receive a lithium oxide in lithium nitrate product along with a source of carbon. A resultant mixture of the two is caused to be heated so as to cause the lithium nitrate to react with the carbon and such that the lithium in the product is reduced to lithium metal. The reduction furnace can be configured such that the carbon is fed around a periphery of the reduction furnace, whereas the lithium oxide in lithium nitrate product can be centrally fed into the reduction furnace.

Reaction dynamics (including heat and pressure) and reaction geometry may be better controlled by the peripheral feeding of carbon (e.g. of ash-free carbon briquettes) into the reduction furnace and the central feeding of the lithium oxide in lithium nitrate product. In this regard, the peripheral carbon may form a reaction bed within the furnace that slopes down to a central reaction zone located towards a lower region of the furnace. The reduction reaction may occur within this reaction zone. In use, the carbon can gradually feed down the reaction bed slope of the reacting mass into the central reaction region. As above, the reaction between the lithium nitrate and the carbon can produce furnace temperatures of at least 1,500° C. (perhaps as much as 2,000° C.). At these furnace temperatures, the lithium oxide will readily reduce to lithium metal.

After reaction initiation, a proportion of the heat for the reduction furnace can come from the reaction between the lithium nitrate and carbon, with an optimal proportion of lithium nitrate in the product sought to be fed into the furnace, as set forth above. The lithium oxide in lithium nitrate product may also be pre-heated in a holding vessel (e.g. to melt the lithium nitrate) prior to the product being fed into the reduction furnace. The reduction furnace may be otherwise configured as set forth in the system above.

Also disclosed herein is a process for producing a battery electrode. The process comprises heating a lithium oxide in lithium nitrate product so as to form molten lithium nitrate (i.e. with the lithium oxide dispersed therein—e.g. as solid lithium oxide crystals dispersed therein). The lithium oxide in lithium nitrate product may be produced in accordance with the process as set forth above.

The process also comprises adding one or more transition-metal oxides, hydroxides, carbonates or nitrates thereto, optionally along with other required electrode materials. The resultant blend may be further heat treated to produce a battery electrode.

BRIEF DESCRIPTION OF THE DRAWINGS

Embodiments of a process, apparatus and system will now be described with reference to the accompanying drawings, which are exemplary only. The drawings primarily relate to the conversion of pure lithium nitrate (i.e. as produced by the methods as described herein and/or as set forth in WO2017/106925) to lithium nitrate/lithium oxide blends, and also relate to the conversion of such blends to lithium metal. In the drawings:

FIG. 1 is a concept block diagram outlining a process and system for recovering lithium values from a lithium-containing silicate mineral (e.g. spodumene), and converting the recovered lithium values to blends of lithium nitrate and lithium oxide, and then in turn, converting such blends to lithium metal. In FIG. 1, the total process is divided into four 'blocks', as follows:
1. Digestion of e.g. spodumene in nitric acid and production of pure lithium nitrate.
2. Partial decomposition of pure lithium nitrate to lithium oxide and oxides of nitrogen.
3. Converting the oxides of nitrogen into nitric acid for re-use in the digestion stage of block 1.
4. Conversion of lithium oxide/lithium nitrate blends to lithium metal.

FIG. 2 covers and details blocks 2 and 3 of FIG. 1, with FIG. 2 being a schematic flow diagram that illustrates how pure lithium nitrate crystals may be converted to a lithium nitrate and lithium oxide blended product, and how the gases from the thermal decomposition of lithium nitrate (oxides of nitrogen and oxygen) can be reconstituted to form nitric acid useable in the total process (e.g. in the digestion of block 1).

FIG. 3 covers and details block 4 of FIG. 1, with FIG. 3 being a schematic flow diagram that illustrates a more specific embodiment of the production of lithium metal from blends of lithium nitrate and lithium oxide.

FIG. 4 presents a schematic diagram that represents a more detailed depiction of an embodiment of a reduction reactor for the production of lithium metal from blends of lithium nitrate and lithium oxide.

DETAILED DESCRIPTION OF SPECIFIC EMBODIMENTS

In the following detailed description, reference is made to accompanying drawings which form a part of the detailed description. The illustrative embodiments described in the detailed description, and depicted in the drawings, are not intended to be limiting. Other embodiments may be utilised and other changes may be made without departing from the spirit or scope of the subject matter disclosed herein. It will be readily understood that the aspects of the present disclosure, as generally described herein and illustrated in the drawings can be arranged, substituted, combined, separated and designed in a wide variety of different configurations, all of which are contemplated in this disclosure.

The specific processes as set forth herein draw upon blends of lithium oxide and lithium nitrate, the proportions of which may be varied to suit particular requirements. The novel blends will henceforth in this detailed description be referred to as "Nitrolox". The Nitrolox product may be derived from a broad range of primary lithium-containing raw materials including but not limited to hard-rock (silicate) minerals, lithium-rich brines as found e.g. in the so-called 'Lithium Triangle' of South America, certain clays, and even the mineral jadarite.

Initially, in the following detailed description, each of the following methodologies will be described:
1. Methods for producing pure lithium nitrate from the principal classes of naturally-occurring lithium-rich minerals, namely, metal silicates (including micas and clays, each discussed separately), and brines;
2. Methods for preparing preferred blends of lithium oxide and lithium nitrate; and
3. An outline of unique uses of such blends for the preparation of both lithium battery cathode and anode materials, and lithium metal.

1. Production of Pure Lithium Nitrate from Lithium Minerals

Lithium nitrate is the initial product of all of the processes described below. Lithium nitrate uniquely allows for the convenient and economical production of lithium oxide (lithia). As set forth in WO2017/106925 (i.e. U.S. Pat. No. 10,131,968 and CN 106906359), lithia is an ideal starting point for the manufacture of pure, marketable lithium chemicals including: the hydroxide ($LiOH·H_2O$), and the carbonate ($Li_2CO_3$)—lithium accounting is usually expressed in the industry in terms of lithium carbonate equivalent or LCE, and elemental lithium. In future, lithium metal is expected to be the preferred material for anodes for new-generation lithium batteries, and for alloying purposes—e.g. lithium-aluminium alloys are finding favour in aerospace industries and other applications where high strength and temperature resistance combined with light weight are valued attributes.

A. Lithium Nitrate from Hard-Rock (Silicate) Minerals

WO2017/106925 (equiv. to U.S. Pat. No. 10,131,968 and CN 106906359) to the present applicant discloses a process for recovering lithium values from a lithium-containing silicate material. Such materials can include the hard-rock mineral spodumene ($LiAlSi_2O_6$) and/or any of a range of other lithium-containing silicate minerals including but not limited to, the minerals petalite $LiAlSi_4O_{10}$ and eucryptite $LiAlSiO_4$. Throughout this specification, any and all references to the mineral 'spodumene' should be taken to include these other lithium-containing metal silicate minerals.

In WO2017/106925, the use of nitric acid to digest the activated spodumene can avoid the need to purchase and consume expensive and hazardous chemicals such as sulphuric acid and sodium carbonate (soda ash). The process disclosed in WO2017/106925 can also avoid the production of unwanted by-products, such as sodium sulphate or gypsum or analcite (analcime). One reason is that nitric acid allows for a 'closed' process: i.e. once consumed in the digestion process, nitric acid may be almost fully reconstituted and recycled. The process disclosed in WO2017/106925 may also involve a minimum of processing steps.

The process disclosed in WO2017/106925 comprises mixing the pre-treated silicate mineral with nitric acid. The process further comprises subjecting the mixture to a leaching process having conditions such that lithium values in the silicate mineral are leached from the latter by the nitric acid (the lixiviant) to form lithium nitrate.

In WO2017/106925, typically the silicate mineral pre-treatment may comprise thermal treatment such as by calcination, wherein the temperature of the solids may be raised to a level that is adequate to bring about a phase-change (e.g. of the naturally occurring a spodumene, to convert it to a more reactive β form).

As part of the leaching process, the blend of pre-treated silicate mineral with a stoichiometric excess of nitric acid may be subjected to a digestion process that can take place in a digestion reactor (e.g. autoclave) that may employ one or more stages, and that may be conducted under conditions such that lithium values in the silicate mineral are converted to soluble lithium nitrate.

A desired digestion reaction can be expressed as:

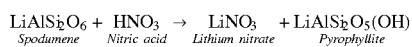

$$LiAlSi_2O_6 + HNO_3 \rightarrow LiNO_3 + LiAlSi_2O_5(OH) \quad 1)$$
Spodumene  Nitric acid  Lithium nitrate  Pyrophyllite Inevitably, other impurities in the pre-treated spodumene may be rendered soluble to varying extents by being converted to nitrates, including the alkali metals sodium and potassium, aluminium, iron, other transition and alkaline earth metals (calcium and magnesium), and the phosphate ion.

In WO2017/106925, the product of the leaching process is a slurry or paste comprised of an aqueous phase containing lithium ions and some other soluble cations and anions, and a residuum of free nitric acid and water, along with an insoluble phase representing the remnant spodumene concentrate now substantially stripped of its lithium content. This slurry or paste is diluted with process water and fed to a solids-liquids separation system, wherein the insoluble solids are separated from the solution and washed to recover lithium values, to yield clarified, lithium-rich pregnant liquor.

This liquor, which is strongly acidic because of its residual free nitric acid content, is then boiled to concentrate and distil off most of the free nitric acid and water; the former is recycled after further treatment to the digestion reactors, while the latter is used as process water.

The boiling continues to maintain a certain level of acidity (pH) in the liquor, whereupon aluminium values in the liquor auto-hydrolyse, to form a precipitate of aluminium hydroxide, while boiling off the nitric acid formed:

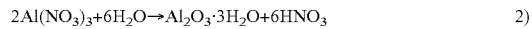

$$2Al(NO_3)_3 + 6H_2O \rightarrow Al_2O_3·3H_2O + 6HNO_3 \quad 2)$$

The insoluble aluminium hydroxide is separated by filtration and may be further purified to produce, inter alia, a more pure alumina product. The filtrate, a concentrated solution, still mildly acidic, is then rendered approximately pH neutral to slightly alkaline by the addition of appropriate quantities of lithium oxide, hydroxide or carbonate, any of which may be produced downstream in various embodiments of the process.

The result is the formation of additional lithium nitrate but, because most of the free nitric acid is first stripped by distillation from the pregnant liquor, the quantities of lithium-based alkali requiring to be recycled in this manner are much less than they would be if all of the free nitric acid originally present in the raw filtrate needed to be neutralised.

These reactions occur in an agitated tank or series of such tanks. Although not disclosed in WO2017/106925, as the liquor is fed to the tank(s), it can be seeded with fine crystals of alumina trihydrate, and the contents of the tank(s) can be maintained to be pH neutral to mildly alkaline by the controlled addition of further lithium hydroxide. This allows any residual alumina values to precipitate by growing on the alumina seed:

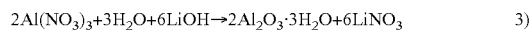

$$2Al(NO_3)_3 + 3H_2O + 6LiOH \rightarrow 2Al_2O_3·3H_2O + 6LiNO_3 \quad 3)$$

Although not disclosed in WO2017/106925, the contents of the tank(s) can be circulated through a hydrocyclone or a bank of the same, to remove a coarser fraction of alumina crystals by way of the hydrocyclone's underflow, which can then be separated from the liquor by familiar solids-liquids separation processes, including washing and dewatering, to produce a pure crystalline alumina trihydrate product. The overflow from the hydrocyclone bank can be returned to the tank(s) in such a way that its content of residual alumina trihydrate fines serve as nuclei for the further precipitation of this compound by way of crystal growth. This process is referred to as "Ostwald Ripening". The final overflow from the tank(s) is a liquor essentially free of suspended solids.

This 'solids-free' liquor is dosed with additional lithium hydroxide (formed by slaking lithium oxide) to raise the pH to a level where magnesium values, present in the liquor as the nitrate, are precipitated as insoluble magnesium hydroxide (the mineral brucite):

$$Mg(NO_3)_2 + 2LiOH \rightarrow Mg(OH)_2 + 2LiNO_3 \quad \quad 4)$$

Then, the correct quantities of the carbonate of another alkali metal e.g. sodium or potassium, or preferably, lithium carbonate (or additional lithium hydroxide followed by carbon dioxide in the correct proportions) is added to precipitate residual calcium values:

$$Ca(NO_3)_2 + Li_2CO_3 \rightarrow CaCO_3 + 2LiNO_3 \quad \quad 5)$$

The liquor, containing calcium and magnesium values as suspended solids, passes to a clarifier that allows these to settle out as an underflow leaving a clarified overflow. This clarified overflow passes to a holding or storage tank, while the underflow passes to a solids-liquids separation device, which can be a centrifuge, to recover the insoluble solids and wash them of residual lithium-rich liquor. The filtrates/centrates are returned to the clarifier feed.

This clarified overflow will be a solution of lithium nitrate essentially free of other cations apart from the alkali metals sodium, potassium, and smaller quantities of the rarer rubidium and caesium, that enter the system as impurities in the original spodumene concentrates. However, alkaline earth, aluminium and transition metals are substantially absent, as are phosphate ions, detectable only at parts-per-million levels.

In a specific embodiment of WO2017/106925, the now-purified solution of lithium nitrates may be further concentrated and then crystallised to form a higher-purity solid lithium nitrate $LiNO_3$. The first crystallisation stage may employ an evaporator/crystallizer. WO2017/106925 also outlines the processes by which a pure, dry crystalline lithium nitrate product can be obtained, and separated from a residual solution rich in other alkali metal nitrates (viz. sodium and potassium). Such a high-purity solid lithium nitrate $LiNO_3$ can form the feed material to the thermal decomposition process as disclosed herein, and such as is described in detail with reference to FIG. 2.

B. Lithium Nitrate from Lithium-Rich Brines

Lithium is present in certain brines in the salt lakes (salars) of the so-called Lithium Triangle of South America. Lithium is present in such brines as ions at concentrations typically around 0.1% and possibly as high as 0.4%. Other cations present, usually in higher quantities, are sodium and potassium, along with varying quantities of magnesium and calcium. The most abundant anions are chloride and sulphate, mainly the former, although concentrations and proportions of all species vary not only between salars, but across individual salars. The following detailed description of the salars is to therefore be understood as general in nature.

The way these brines are generally processed (refined) to recover their lithium values begins by extracting them from the fissures and other void spaces characteristic of the upper forty metres or so of the salars' solid salt mass, using submerged pumps. Below this depth fissures are generally absent; from this depth to the bottom of the salar, all that is typically encountered is essentially impermeable rock salt: sodium chloride containing variable concentrations of potassium chloride and gypsum. The submerged pumps transfer the brines into drying pans formed on the dried hard-crust surfaces of the salars where water evaporates in the sunny, high-desert environment. As solar evaporation proceeds, various salts crystallize out and, in order to separate out a single type of reasonably pure crystallized salt in a single pan, the brines are pumped sequentially from pan to pan, to be held in a particular pan long enough for the next salt to be substantially removed by concentration (by natural evaporation), and crystallisation.

First to crystallise out will be much of the common salt, NaCl, and/or the sparingly soluble gypsum ($CaSO_4 \cdot 2H_2O$).

What remains of the cations present will be a blend of mostly potassium, magnesium and lithium, with chloride the principal anion. Magnesium, when present in high concentrations, can be a problem because both its sulphate and chloride are quite soluble in aqueous solutions. Milk of lime may be added in appropriate quantities to precipitate the magnesium as insoluble magnesium hydroxide but, as per the reaction shown below, calcium will then be added into the brine.

$$MgCl_2 + Ca(OH)_2 \rightarrow Mg(OH)_2 + CaCl_2 \quad \quad 6)$$

If sulphate ion concentrations are still significant, much of the calcium including that added according to reaction 6) may settle out as more gypsum:

$$MgSO_4 + Ca(OH)_2 + 2H_2O \rightarrow Mg(OH)_2 + CaSO_4 \cdot 2H_2O \quad \quad 7)$$

Otherwise the calcium may be removed using sodium carbonate (soda ash), which precipitates the calcium out as insoluble carbonate, adding more sodium to the brine to make more common salt.

$$CaCl_2 + Na_2CO_3 \rightarrow CaCO_3 + 2NaCl \quad \quad 8)$$

Then, with further concentration by solar evaporation, potassium chloride (potash, a valuable product) crystallizes out in yet another evaporation pan. Alternatively, if readily available, Chile saltpetre (sodium nitrate) may, after leaching with water and solids-liquids separation to remove insoluble solids, be added to the concentrated brine, and the blend evaporated thermally at boiling point, wherein the following reaction occurs:

$$KCl + NaNO_3 \rightarrow NaCl + KNO_3 \quad \quad 9)$$

The reaction proceeds to the right because the common salt is the least soluble of the salts, leaving a solution dominated by potassium nitrate, a valuable fertilizer. This may be recovered by cooling the residual brine, e.g. by vacuum chilling, and the crystals dewatered. Typically, in some Chile saltpetre deposits, perhaps 10% of the sodium ions are replaced by potassium ions; these will also crystallise out as additional potassium nitrate.

What remains is a residual solution in which lithium is by now quite concentrated, and chloride is the principal anion, leaving in effect a concentrated solution of lithium chloride with a range of residual salts present as minor impurities.

In normal processing, the lithium-rich brine is heated to above 70° C. and more soda ash is added to precipitate the lithium as sparingly soluble lithium carbonate. This is the primary lithium product, to be further purified by various processes known to those skilled in the relevant art, including re-carbonation. Overall recoveries of lithium can vary but 50-80 percent of that originally present in the raw brine are typical.

The description given so far is representative of the current art as employed at the salars of the South American Lithium Triangle, particularly at the important Salar de Atacama in Chile. It is also important to stress once more, that the above represents a highly simplified description of the generic process: the evaporation and crystallization sequences within them may vary depending on the original composition of the brines and the preferences of the operators.

The following description now represents a departure from the known art. The following description describes a process for the production of pure crystalline lithium nitrate from a source of salar salts.

The starting feed for the process is the concentrated solution of lithium chloride plus residual quantities of other salts, mostly common salt (i.e. being the residual solution out from which the potassium nitrate has crystallised out). It should be noted that the production of potassium nitrate is normally only an option if the processor also has ready access to Chile saltpetre (i.e. some of the major Chilean-based lithium producers have ready access to a supply of Chile saltpetre).

In what is essentially a replay of the process for producing potassium nitrate, and after as much as practicable of the potassium values have been recovered from the brines, more Chile saltpetre is added to the lithium chloride-rich brine, and the blend is evaporated thermally at boiling point, in which case the following reaction occurs:

$$LiCl + NaNO_3 \rightarrow NaCl + LiNO_3 \qquad 10)$$

Again, the common salt crystallises out, and is washed of its residual lithium nitrate-rich liquor, leaving a concentrated solution of lithium nitrate.

The lithium nitrate solution is cooled e.g. by vacuum chilling, and pure lithium nitrate crystals result, which may be removed by conventional solids-liquids separation processes, such as by a suitable filter-type centrifuge. The residual brine (i.e. the filtrate/centrate) is recirculated. If desired, the lithium nitrate may be further purified by various means, such as by additional crystallisation, impurity removal from pregnant liquors using ion exchange resins, drying the crystalline mass and dissolving this in a mildly polar organic solvent in which lithium nitrate is soluble but nitrates of the other alkali metals are not (refer below). Other purification methods may be employed as known by those skilled in the relevant art.

C. Lithium Nitrate from Other Minerals: Micas, Clays and Jadarite.

Lithium occurs in other minerals including some in the mica group, notably amblygonite (Li, Na)AlPO$_4$(F, OH), lepidolite K(Li, Al, Rb)$_3$(Al, Si)$_4$O$_{10}$(F, OH)$_2$ and zinnwaldite KLiFeAl(Al, Si$_3$)O$_{10}$(F, OH)$_2$. Lithium may also be present in certain clays that are the result of partial weathering of such micaceous minerals including hectorite Na$_{0.3}$(Mg, Li)$_3$Si$_4$O$_{10}$(OH)$_2$. Another third category of mineral is the borosilicate mineral jadarite LiNaSiB$_3$O$_7$OH, which may also be written in the form Na$_2$O·Li$_2$O·(SiO$_2$)$_2$·(B$_2$O$_3$)$_3$·H$_2$O, named after the nearby town of Jadar in Serbia, and first defined as a unique mineral only in 2006. Jadarite promises to become a significant source of lithium in future as well as a source of boron; there is close to five times as much of the latter element as there is of lithium, which substantially adds to the value of this resource. Prior art investigations are ongoing to determine processing options, but none of these options are known to involve the use of nitric acid.

It has been surprisingly discovered that all of these minerals can be made to substantially dissolve in hot nitric acid.

Amblygonite, Lepidolite and Zinnwaldite

These are relatively soft minerals and generally do not need to be calcined in order to render them susceptible to leaching by a mineral acid such as nitric acid. In one embodiment, the minerals are pulverized in an impact mill or a set of high-pressure grinding rolls, to substantially delaminate the 'sheets' that are characteristic of micas, to thereby improve penetration by the acid, hence increase extraction of the metals as metal nitrates (i.e. when nitric acid is used).

In one particular embodiment, lepidolite is finely ground, beneficiated as necessary and then reacted with nitric acid in a similar manner to that described for recovering lithium values from calcined spodumene. Most of the lithium, sodium, potassium and rubidium (a rare alkali metal similar to potassium, and present in varying but generally low concentrations in lepidolite) are converted to nitrates, as are some of the aluminium, calcium, magnesium and transition metals present as impurities. The pregnant liquor left after the insoluble solids have been removed, and the excess nitric acid and much of the water have been distilled off, is purified again using techniques as described above for calcined spodumene. High fluorine levels can present a challenge because, to the extent fluorine enters solution (as fluoride ions), it will tend to remove lithium as sparingly soluble lithium fluoride. Phosphorus values are precipitated as insoluble tri-calcium phosphate (the mineral apatite).

Whereas it is possible to recover nitric acid by thermally decomposing lithium nitrate, then collecting the oxides of nitrogen, and oxygen, produced as off-gases and combining these with water and additional oxygen (from air), this recovery of nitric acid is not possible for the other alkali metals present, namely, sodium and potassium (and rubidium), of which potassium is generally the most abundant. There are several options for separating the lithium values from the other alkali metals. One option is to dry the blend of alkali-metal salts, and leach the lithium values using a mildly polar solvent capable of dissolving lithium nitrate but not the other alkali-metal nitrates. A number of polar hydrocarbon solvents (such as acetone) are highly flammable and are therefore not favoured for this application. However, heavily chlorinated simple hydrocarbons such as chloroform (trichloromethane) are safer and thus can be suitably employed to dissolve and separate lithium nitrate. The polar solvent may then be recovered from the lithium nitrate (and any other solids which may be present) using vacuum distillation, for re-use of the solvent.

Once lithium nitrate has been separated, the residue (primarily a blend of sodium and potassium nitrates) has value as a fertilizer, particularly if the potassium values dominate. Potassium nitrate is a valuable fertilizer (widely used in drip irrigation systems), and more so than either potassium chloride or sodium nitrate, because it contains not one but two of the three essential plant nutrients, namely, potassium (K) and nitrogen (N), (the third being phosphorus (P)).

In one lepidolite treatment embodiment, which can be employed where a source of lithium chloride is readily available (e.g. in a salar context), the following reaction may be performed before the lithium values are leached using the mildly polar solvent. In this regard, reference is made to the processes as described above for treating salars, which culminate in reaction 10). A reaction that is similar to reaction 10) can be employed as follows:

$$LiCl + NaNO_3/KNO_3 \rightarrow Na/KCl + LiNO_3 \qquad 10')$$

The resultant NaCl and KCl salts can be separated from the LiNO$_3$, with the latter then being ready for further purification prior to being passed to the thermal decomposition stage.

However, where sodium, potassium and (if present) rubidium nitrates have been formed, and have not been recovered by a procedure such as is set forth in reaction 9), nitric acid is thus lost to the total process. Further, as set forth above, the nitrates of these alkali metals do not decompose on heating in the same manner as does lithium nitrate. However, the loss of nitrates by this mechanism, plus other losses of nitrates (hence of nitric acid) from the system, can be made up using ammonia, specifically, by its combustion facilitated by a suitable catalyst (e.g. platinum gauze) in air, as described earlier, according to processes familiar to those who have been involved with the manufacture of nitric acid by the Ostwald Process. In this regard, one tonne of ammonia is able to make up for the losses of nitrate when 6 tonnes of potassium nitrate are formed. Rubidium is likely to be present only in low concentrations. Since rubidium behaves similarly to potassium, and is not toxic to plants (although it has no fertilizer value), it need not be separated from potassium nitrate unless its concentrations are particularly high, in which case there may be an economic case for its recovery by additional methodologies.

Jadarite

Nitric acid can also form the basis of a more effective process for the production of lithium nitrate from jadarite. The jadarite mineral is ground, then reacted with hot nitric acid:

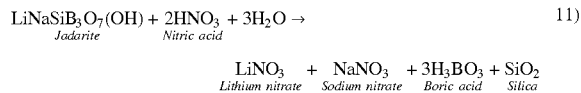

$$\underset{\text{Jadarite}}{\text{LiNaSiB}_3\text{O}_7(\text{OH})} + 2\underset{\text{Nitric acid}}{\text{HNO}_3} + 3\text{H}_2\text{O} \rightarrow \qquad (11)$$
$$\underset{\text{Lithium nitrate}}{\text{LiNO}_3} + \underset{\text{Sodium nitrate}}{\text{NaNO}_3} + 3\underset{\text{Boric acid}}{\text{H}_3\text{BO}_3} + \underset{\text{Silica}}{\text{SiO}_2}$$

The nitric acid concentration cannot be allowed to exceed the solubility of the boric acid, which is around 24 grams/100 ml of demineralised water at close to boiling-water temperatures.

The product from the leaching reactors may be filtered to remove silica and any other insoluble impurities, leaving a clear solution of boric acid and the highly soluble nitrates of sodium and lithium. If the solution is cooled e.g. by vacuum chilling, boric acid will settle out in the form of colourless crystals. In one embodiment these crystals are separated out and washed by a decanter centrifuge, or by using the screen-bowl variant of such a centrifuge.

Separation of lithium nitrate from its sodium counterpart by crystallisation from aqueous solutions presents challenges because both are highly soluble in water with comparably steep solubility curves. However, as in the discussion on lithium-rich micas, sodium nitrate is insoluble in certain polar solvents such as acetone, whereas lithium nitrate dissolves in this liquid, allowing the two to be separated.

In one embodiment, the residue from the crystallisation of boric acid is evaporated to dryness, ground to powder and blended with sufficient acetone to dissolve the lithium nitrate. The insoluble sodium nitrate is then filtered or centrifuged out and washed. In one embodiment, a filtering centrifuge is employed, leaving a solution rich in lithium nitrate. This solution is distilled off under vacuum, leaving a mass of lithium nitrate, while recovering and condensing the acetone in an air-cooled condenser for re-use.

Acetone solvent may pose a risk of forming an explosive mixture with alkali-metal nitrates, hence other solvents that are comparably polar to acetone but not flammable can be employed, for example, a heavily chlorinated hydrocarbon such as tri-chloromethane.

The residual sodium nitrate may find use as a fertilizer. Alternatively, as per the process for producing lithium nitrate from lithium-rich (salar) brines, if there is a source of lithium chloride available within reasonable transport distances, this can be converted to lithium nitrate as per the process embodied in reaction 10) above.

2. Production of Lithium Oxide-Nitrate Blends for Battery Cathodes

Lithium nitrate can have certain advantages for battery manufacturers and others responsible for the manufacture of lithium/transition-metal oxides (or hydroxides, carbonates or nitrates) and related compounds for cathodes. Such cathodes have the generic compositions (when in a battery cell, the cathode is fully discharged) as follows:

$LiMO_2$, where M is a transition metal or blend of metals that includes one or more of cobalt, nickel, manganese, iron, chromium and titanium and perhaps (while not a transition element) aluminium, having an oxidation state of +3; and $Li_2M'O_3$, where M' is a transition metal or blend of metals that includes one or more of cobalt, nickel, manganese, chromium, and titanium having an oxidation state of +4.

These compounds are made by blending the metals in precise proportions in the form of their finely ground oxides or salts (which may be sulphates, chlorides or nitrates) along with lithium compounds, usually the carbonate or hydroxide, and heating the blends, typically in stages, until one or more of the compounds melts. This allows the transport and rearrangement of ions into the desired structured compounds mimicking, for example, the crystal structures of the minerals: spinel, olivine, perovskite or one or other of the zeolites (i.e. structures able to accommodate the passage of lithium ions into and out of their crystalline structures). Typically, these blends are processed on a batch basis, including being held at temperatures of the order of 850° C. or higher, for periods of 10 hours or more. The exact details by which these compounds are made are closely guarded commercial secrets, so the above description is general.

The process for producing such cathodes begins by having one or more of the components melt, to form an electrically conductive medium. It is advantageous to have at least one component with a lower melting temperature. It is also advantageous to have ingredients that decompose to their respective oxides at relatively low temperatures and with a minimum production of water vapour or carbon dioxide, which can otherwise re-combine with the materials once temperatures are allowed to fall.

The original form in which lithium was supplied to battery manufacturers was (and to a large extent remains) lithium carbonate. Lithium carbonate melts at a temperature of around 725° C. and does not decompose (to lithium oxide) until temperatures of around 1,300° C. are reached. Lithium hydroxide is increasingly preferred by battery manufacturers, in part because it melts at around 460° C. and decomposes (to lithium oxide) at 925° C. Lithium oxide itself is even more refractory, not melting until temperatures exceed 1,450° C. Lithium oxide thus requires another compound with a lower melting point if the necessary reactions for forming lithium/transition-metal cathode compounds are to occur.

Lithium nitrate can have distinct advantages in this context. When pure, lithium nitrate melts at the relatively low temperature of ~260° C. Above these temperatures lithium nitrate becomes a clear, mobile liquid, one that is electrically conductive, meaning that lithium nitrate may be further heated using electrical induction, and it can readily accommodate the transition-metal compounds required for producing a given cathode material. Lithium nitrate decomposes (according to reaction 12)) at just ~600° C., yielding lithium oxide, oxides of nitrogen and free oxygen.

$$4LiNO_3 \rightarrow 2Li_2O + 4NO + 3O_2. \qquad 12)$$

Where decomposition proceeds to completion, an initial 1 kilogram of lithium nitrate (in pure and anhydrous form) results in just 0.22 kg of lithium oxide, yet it contains the same quantity of lithium, which is to say the elemental lithium content of lithium nitrate is but 10 wt. %, while that of pure lithium oxide is 46 wt. %.

Of particular interest are blends of lithium nitrate and lithium oxide obtained by the partial decomposition of the lithium nitrate, referred to herein as Nitrolox. The table below shows the result of decomposing the nominated quantities of lithium nitrate:

TABLE 1

Compositions of lithium nitrate/lithium oxide blends

| % $Li_2O$ by wt. in Nitrolox | % $LiNO_3$ de-composed | % wt. loss from de-composition | % Lithium in Nitrolox |
|---|---|---|---|
| 0% | 0% | 0.0% | 10.1% |
| 10% | 29% | −26.5% | 13.7% |
| 20% | 46% | −42.0% | 17.3% |
| 30% | 59% | −52.0% | 21.0% |
| 40% | 68% | −59.1% | 24.6% |
| 50% | 75% | −64.4% | 28.3% |
| 60% | 81% | −68.4% | 31.9% |
| 70% | 87% | −71.7% | 35.5% |
| 80% | 92% | −74.3% | 39.2% |
| 90% | 96% | −76.5% | 42.8% |
| 100% | 100% | −78.3% | 46.5% |

The numbers below the line represent compositions so rich in lithium oxide that they are unlikely to be handled as slurries or pastes (i.e. at greater than 90% decomposition, there is likely to be an insufficient amount of molten $LiNO_3$ at temperatures above ~260° C.).

By way of example (highlighted in bold in the table above), lithium nitrate is heated to temperatures above its decomposition temperature until 75% decomposed to lithium oxide (column 2). At that point, all of the lithium originally in the lithium nitrate is concentrated into a mass which is 50% lithium nitrate and 50% lithium oxide, which is able to be handled as a paste (i.e. above temperatures at which lithium nitrate melts, i.e. ~260° C., and preferably around 300° C.). And yet, the resultant 50% lithium nitrate and 50% lithium oxide weighs little more than one-third as much (column 3) as when it was in the form of pure anhydrous lithium nitrate. It follows that the lithium concentration by weight has almost tripled (from around 10% to 28%. Column 4).

When in the form of a paste, the blend is able to be readily converted into prill, pellet or flake form using methods familiar to the conversion of materials such as molten-salt mixes to prills (e.g. using a prilling tower). When in such forms, this simplifies handling and storage (e.g. the solids may be stored in sealed 200 litre drums). The high lithium content of such blends means that they have freight advantages over lithium carbonate (19% Li) and lithium hydroxide monohydrate (16% Li).

3. Production of Lithium Metal from Nitrolox Blends

Lithium oxide, which is advantageously and uniquely produced directly from lithium nitrate in the process disclosed herein, can be conveniently converted to lithium metal, such as by a process of carbothermal reduction. Significantly, the inventor has realised that equipment and systems that have been developed for the production of magnesium metal from magnesium oxide by carbothermal reduction can be adapted to the production of lithium metal. This, in itself, is an important and potentially highly valuable innovation, insofar as existing methods in existence for the production of lithium metal are complex and expensive, relying on the electrolysis of a molten mix of highly purified, anhydrous lithium and potassium chlorides at temperatures of around ~450° C. The production of the principal feed to such existing methods (i.e. high-purity, anhydrous lithium chloride) also involves complex processing.

Carbothermal reduction processes are the basis for the production of many important metals, notably iron and steel, but also manganese, ferrosilicon, pure silicon and (indirectly) magnesium metal. For example, there is the Kroll process (which uses magnesium metal as reductant) for titanium metal production.

Of further significance, the present inventor has realised that lithium nitrate and lithium oxide can be reduced directly to lithium metal by applying technology developed originally for magnesium metal production by a direct carbothermal process. One such example is set forth in U.S. Pat. No. 9,090,954, which discloses a process whereby a blend of magnesium oxide and carbon in some form (e.g. graphite, petroleum coke or coke derived from coal) is formed into briquettes, which are in turn heated electrically in a furnace (which may employ either induction or electric arc heating) to temperatures that can approach ~2,000° C. This initiates a reversible reaction wherein the magnesium oxide is reduced to magnesium metal, and the carbon is oxidised to carbon monoxide, according to the following equation:

$$MgO + C \rightarrow Mg + CO \qquad 13)$$

In order to prevent the reaction from reversing (proceeding from right to left), the hot vapours (magnesium vapour and carbon monoxide) are flash-cooled by expanding them supersonically through a convergent-divergent (de Laval) nozzle, whereby cooling is effected so rapidly by way of expansion of the gases that the reverse reaction cannot occur to any significant extent. The process described in U.S. Pat. No. 9,090,954 defines a facility for ensuring that the nozzle remains sufficiently hot such that no impurities are able to condense and accrete on its exposed surfaces, risking a deterioration of performance of the nozzle and even blockages.

With pure lithium oxide (which is inherently produced in the process as disclosed herein) and by resorting only to forms of carbon that are essentially devoid of mineral matter (e.g. certain grades of petroleum coke, or coke made from coal having naturally low ash levels, or coal that has first had its ash content chemically removed (ultra-clean coal)), the present process can resort to earlier art, for example, the procedure of Hori, including procedures as set forth in U.S. Pat. Nos. 4,147,534 and 4,200,264. These processes involve similar apparatus to U.S. Pat. No. 9,090,954, but without the features for ensuring that the nozzle remains adequately heated.

Further, in the case of the carbothermal production of lithium metal by the means of U.S. Pat. Nos. 4,147,534 and 4,200,264, the inventor notes that there should be insufficient condensable mineral matter passing through the nozzle and prone to condense and accrete on its exposed surfaces, such that the risk of degraded nozzle performance should be minimal. Conveniently, lithium metal remains in liquid form throughout an extended temperature range, including under the conditions prevailing at the nozzle exit. This facilitates the rapid separation of lithium metal from the current of carbon monoxide gas, etc.

In one embodiment, this rapid separation can occur by employing one or more banks of cyclone separators operating in series. Further, the carbon monoxide gas produced by the direct carbothermal process can itself be used as fuel, including as a partial substitute for natural gas to be used for the calcination of an original source of lithium-containing silicate mineral.

The reaction involved with lithium oxide is:

$$Li_2O + C \rightarrow 2Li + CO \quad\quad\quad 14)$$

The inventor has further appreciated that Nitrolox blends may form the basis of an even simpler method for producing lithium metal.

A challenge with the carbothermal production methods described thus far is maintaining furnace temperatures of the order of 2,000° C. The only satisfactory methods involve electrical heating, either by induction or electric arc. Reaction 14) is strongly endothermic so, by the time electrical energy is accounted for sufficient to force reaction 14) to the right, plus the inevitable losses that occur by virtue of the very high temperatures involved, the total reduction process becomes expensive.

Nitrolox inherently contains energy in the form of nitrate ions. Nitrolox blends can be specified that provide some of the energy to effect the carbothermal reduction of lithium oxide. The reaction involving the nitrate portion of Nitrolox is as follows:

$$2LiNO_3 + 6C \rightarrow 2Li + 6CO + N_2 \quad\quad\quad 15)$$

The reaction between lithium nitrate and carbon is highly exothermic; it is on the same basis as gunpowder (i.e. where potassium nitrate rather than lithium nitrate is used). With Nitrolox blends, it follows that reactions 14) and 15) are able to occur in parallel. Reaction 14) is, as mentioned, strongly endothermic, while reaction 15) is strongly exothermic. It follows that the energy released by way of Reaction 15) can offset some of the energy that is required to drive Reaction 14). This can represent a significant saving because the energy required to drive Reaction 14) is typically delivered in the form of electricity.

Comparing Reaction 14) with Reaction 15) shows that the latter yields substantially greater volumes of gases than the former. The inventor has noted that higher gas volumes may lead to marginal increases in the size of plant. However, under the conditions within the reactor, the gases are non-reactive, whilst process control is also improved. A description of suitable plant for the production of lithium metal using Nitrolox and near ash-free carbon, separately fed into the furnace, is provided later with reference to FIGS. 3 and 4.

Reactions 14) and 15) are terminated by supersonically expanding the lithium metal vapour and gaseous by-products through a convergent-divergent (de Laval) nozzle, followed by rapid separation of the condensed lithium metal from such gases through one or more banks of cyclone separators (e.g. operating in series). The resultant lithium metal can be collected and then further purified (i.e. by a separate, downstream process for a required degree of lithium metal purity, such as by vacuum distillation—the usual industrial method by which lithium metal may be further purified).

Thus, should e.g. lithium oxide, lithium nitride, carbon and/or other refractory solid materials be carried-over with the lithium vapours and carbon monoxide passing through the de Laval nozzle and into the cyclones, these can be readily separated by a separate, downstream process (i.e. such as vacuum distillation).

In this regard, it should be noted that lithium oxide does not melt until temperatures exceed 1,450° C., and lithium nitride has a melting point of around 850° C., meaning each would remain as a solid in the course of purification of lithium metal by vacuum distillation. Further, if after such vacuum distillation (i.e. after free lithium metal has been distilled off) there are any lithium values left as lithium nitride, these may be recovered simply by adding the lithium nitride to dilute nitric acid, where it forms lithium nitrate and ammonium nitrate:

$$Li_3N + 4HNO_3 \rightarrow 3LiNO_3 + NH_4NO_3 \quad\quad\quad 16)$$

The process and system for producing lithium metal as outlined above will be described in further detail below with specific reference to FIGS. 3 and 4.

Total Process (Nitrolox and Lithium Metal Production—FIG. 1)

Referring now to FIG. 1, the total process for the production from spodumene of Nitrolox (i.e. blends of lithium nitrate and lithium oxide) and lithium metal is schematically shown as a process block diagram. The total process is shown as comprising four 'blocks' 1-4.

In process block 1, (α) spodumene is passed to, so as to be activated in, a calcining kiln that is fired with e.g. natural gas. Optionally, the calcining kiln may employ a top-up of recycled fuel gas comprising carbon monoxide from lithium metal production. The resultant activated (β) spodumene from the calcining kiln is then passed to a digestion stage (e.g. an autoclave) to be digested under elevated temperatures and pressures by contact with nitric acid. The nitric acid for the digestion stage can be produced in a nitric acid production plant (block 3 of the total process). The feedstock for the nitric acid production plant can comprise the volatiles/off-gases from each of the digestion stage and the lithium nitrate thermal decomposition stage (block 2 of the total process), as well as from a make-up stage (e.g. a catalytic combustion stage of ammonia with air—refer to FIG. 2 herein).

In the digestion stage of process block 1, the β-spodumene is leached with the nitric acid to produce lithium nitrate. The lithium nitrate is separated from and purified of residual materials of the β-spodumene digestion, including purification via a lithium nitrate crystallisation stage. This produces relatively pure lithium nitrate, ready for the thermal decomposition stage (process block 2).

In process block 2, the relatively pure lithium nitrate can be passed to a holding (pre-heating) vessel in which it is heated to a molten state (e.g. by hot process fluids). This pre-heating reduces the load of the thermal decomposition reactor. The molten pure lithium nitrate is then fed to the thermal decomposition reactor (typically an electrical induction-heated or externally fired reactor) in which the lithium nitrate is heated to above its decomposition temperature for a given period of time, and so that a portion of the lithium nitrate decomposes to lithium oxide whilst producing gaseous oxides of nitrogen. The partial decomposition of lithium nitrate produces a blend of solid crystals of lithium oxide in molten lithium nitrate.

Also in process block 2, this blend of lithium oxide in lithium nitrate is extracted from the partial decomposition reactor and is immediately cooled to below the lithium nitrate decomposition temperature (such as in a heat exchanger). Where the thermal decomposition reactor is pressurized, the product (solid lithium oxide in molten lithium nitrate) may also be depressurised. Thus, the product is a Nitrolox slurry/paste (i.e. a slurry/paste comprising solid lithium oxide in molten lithium nitrate). As shown in FIG. 1, a proportion of this slurry/paste can be passed (as Nitrolox) to a solids formation stage (e.g. a prilling tower/column, etc.) in which it is cooled and formed into a solid product of the total process. Another portion can be passed to lithium metal production (block 4 of the total process).

In process block 3, the volatiles from each of the digestion stage and the thermal decomposition stage are combined, cooled and passed to a nitric acid production plant (e.g. an absorption column/tower, or compact heat exchange reactor, etc.). To this combined stream, make-up oxides of nitrogen may be added, which are separately produced in a catalytic combustion reactor in which ammonia is burned in air. The resultant nitric acid from the nitric acid production plant is re-used in the digestion stage of process block 1.

In process block 4, the Nitrolox blend slurry/paste is reduced to lithium metal in a reduction furnace. Typically, the Nitrolox blend, if it is in solid form (i.e. because it has been cooled below the melting-point temperature of lithium nitrate following partial thermal decomposition), is remelted in a holding tank. This remelting is effected prior to the Nitrolox blend being fed centrally into the reduction furnace, along with a source of carbon. Typically, the carbon is essentially devoid of ash-forming mineral matter, and is fed around a periphery of the reduction furnace so as to form a downwardly sloping carbon bed. In the reduction furnace, the lithium nitrate component reacts exothermically and provides a proportion of the heat energy towards attaining sufficiently high temperatures to cause substantially all lithium in the feedstock to be reduced (by reaction with carbon) to lithium metal. As is described in greater detail with reference to FIGS. 3 and 4, the hot lithium metal vapour, along with gaseous by-products, are then rapidly cooled by supersonic expansion through a de Laval nozzle, before being separated from each other to recover the lithium metal.

The process blocks 2 & 3 of FIG. 1 will now be described in greater detail with reference to FIG. 2.

Lithium Oxide Production and Nitric Acid Recycle (FIG. 2)

Referring now to FIG. 2, pure anhydrous crystals of lithium nitrate 21 produced in the total process block 1 are transferred to a liquid lithium nitrate holding tank 22. The lithium nitrate crystals 21 can be transferred to tank 22 via a variable-speed screw conveyor (i.e. to control the process feed rate). The contents of holding tank 22 are maintained at a temperature above the melting point of lithium nitrate (approximately 260° C.) and typically to above 300° C. The temperatures are maintained by a jacket surrounding part of the tank. The jacket comprises multiple channels through which flow a blend of alkali-metal salts: potassium, sodium and lithium nitrates. These may be produced as a by-product of the pure lithium nitrate production process as detailed in WO2017/106925. The temperature of this circulating flow of molten salts is maintained at a temperature higher than for the contents of the tank 22, to ensure the desired temperature of the latter is maintained. Upon entry into the tank 22 the lithium nitrate crystals 21 quickly melt and add to what is a clear, mobile liquid.

As required by the process, the contents of the tank 22 are transferred by pump 23 to the decomposition reactor 24. Where the decomposition reactor 24 is operated under pressure (i.e. where reactor 24 has the form of a pressure vessel—autoclave), the pump 23 can be configured to raise the pressure of the molten lithium nitrate up to a pressure of approximately 10 Bar (9 bar gauge), i.e. up to the operating pressure of the lithium nitrate decomposition reactor 24. The contents of the reactor 24 are maintained at or above the decomposition temperature of pure lithium nitrate, viz. ~600° C.

In the reactor 24, the temperature is maintained by electrical induction, by way of the electrical induction coil 24a shown schematically in section as situated within the reactor 24. However, in another form of the reactor, the temperature can be maintained by external fuel-fired (e.g. natural gas) burners that externally heat the reactor and its contents (i.e. indirect heating).

At the decomposition temperature, the energy added by electrical induction, etc. serves to decompose the lithium nitrate according to Reaction 12):

$$4LiNO_3 \rightarrow 2Li_2O + 4NO + 3O_2. \qquad 12)$$

The lithium oxide forms small crystals that remain suspended in the molten lithium nitrate.

The rate at which reaction 12) proceeds relates directly to the rate of input of electrical, etc. energy. It has been observed that formation of the gases (nitrous oxide and oxygen) do not cause the molten lithium nitrate to foam.

From Table 1 (above), a practical maximum conversion of lithium nitrate to oxide is of the order of 80%, corresponding to a blend of 60% lithium oxide in 40% lithium nitrate by weight. Notably, this blend has the same quantity of lithium as there is in three times the mass of lithium nitrate.

The blend of lithium oxide crystals in molten lithium nitrate (Nitrolox slurry/paste) exits the reactor 24 at a temperature of the order of 600° C. (optionally under a pressure of approximately 10 Bar when reactor 24 is a pressure vessel). The rate this slurry/paste exits the reactor 24 relative to the rate at which anhydrous lithium nitrate enters the reactor 24 will depend heavily upon the desired extent of decomposition of nitrate to oxide, as summarised in Table 1.

A proportion of the hot Nitrolox slurry/paste is passed directly, without further treatment, to a facility for producing lithium metal, as discussed in further detail below with reference to FIGS. 3 & 4. The remaining portion of the hot Nitrolox slurry/paste (or, where there is no on-site production of lithium metal, all of the hot Nitrolox paste/slurry) is then partially cooled by way of a heat exchanger 25, in which it is cooled by a counter-current flow of molten salt (i.e. the blend of nitrates of sodium, potassium and lithium) to approximately 300° C. This, in turn, heats the flow of molten-salt blend for re-use elsewhere in the total process.

The partially cooled Nitrolox slurry/paste is then passed via pump 26 to a prilling tower (not shown), where it is divided into droplets approximately 1-2 mm diameter using equipment and systems familiar to those skilled in the relevant art. The droplets solidify (freeze) by the time they have fallen through the cooled, dry atmosphere passing upwards through the prilling tower, to be collected, transported and sealed within containers. For example, 200-litre capacity stainless steel drums fitted with air-tight lids can be employed. The dry air passing through the prilling tower is scrubbed of dust and other contaminants using process water prior to its discharge to the atmosphere.

Where reactor 24 is a pressure vessel, the pump 26 can take the form of a suitable positive-displacement pump that de-pressurizes the Nitrolox slurry/paste passing through it (i.e. the pump 26 can operate in reverse as a head-recovery device). Thus, much of the pressure of the Nitrolox slurry/paste exiting the reactor can be transferred back (e.g. directly) to the feed pump 23, or it can be exchanged to an intermediate hydraulic fluid that may be used to transfer the pressure between the head-recovery pump 26 and feed pump 23. In each case, the resultant partially cooled, partially de-pressurized Nitrolox slurry/paste then be passed to the prilling tower.

The hot off-gases from reactor 24, a blend of principally nitric oxide and oxygen as per the right-hand side of reaction 12), and also at a temperature of approximately 600° C., pass (optionally under pressure) to a mixer 27. In mixer 27, the gases blend with gases (and, optionally, water in the form of a mist or steam) from elsewhere in the total process.

To the extent that active nitrogen (i.e. nitric oxide NO and nitrogen dioxide/tetroxides, respectively $NO_2$ and $N_2O_4$) is lost from the system, e.g. due to inefficiencies in its recovery, or because of the loss of nitrate ions in the Nitrolox product, these losses of active nitrogen are made up. For example, anhydrous ammonia is purchased as a liquid under pressure, in which form it is brought to site in, for example, road tankers, and stored until required (optionally under pressure), using systems familiar to those skilled in the relevant art. From storage, the anhydrous ammonia is drawn off. Optionally, where reactor 24 operated as a pressure vessel, the anhydrous ammonia can be drawn off at a pressure at least equal to that of the off-gases from the reactor 24 (e.g. approximately 10 Bar (9 Bar gauge)).

By way of processes that conform closely to those involved in the production of nitric acid according to the Ostwald Process, the ammonia is reacted (combusted) in ambient air that can be compressed (e.g. in the case of a pressurized reactor 24) by way of the air compressor 33 over a catalyst that may be of platinum gauze or other material (e.g. a suitable blend of transition-metal oxides, or hydroxides, carbonates or nitrates thereof), to form nitric oxide according to reaction 17):

$$4NH_3 + 5O_2 \rightarrow 4NO + 6H_2O \qquad (17)$$

The temperature of the gases on the right-hand side of reaction 17) may be of the order of 700° C. These are blended with the off-gases from reactor 24 in the mixer 27 which are nearly as hot, at approximately 600° C. These are also blended with the off-gases and vapours from lithium nitrate production, and which can have their pressure increased (e.g. to approximately 10 Bar) by way of the gas compressor 31, which also serves to heat said off-gases and vapours adiabatically until they are comparably as hot as the other gases entering the mixer 27.

The resultant combined gas stream from the mixer 27 is cooled in three stages: first, by passing it through a heat exchanger 28 in the form of a shell-and-tube vessel, through the tubes of which flow relatively cool (initially approximately 150° C.) alkali-metal molten nitrate salt blend, which is in turn, heated. The partially cooled gases then pass through a water-cooled heat exchanger 29, the cooling water being process water, before they pass to the nitric acid absorption tower 30. This tower is also cooled by way of chilled water circulating through tubes dispersed through the tower packing. Within this tower the following reactions occur, leading to the formation of nitric acid:

$$2NO + O_2 \rightarrow 2NO_2 \qquad (18a)$$

$$3NO_2 + H_2O \rightarrow 2HNO_3 + NO \qquad (18b)$$

The NO formed in reaction 18b) recycles to reaction 18a).

Typically, the nitric acid from the absorption tower 30 is concentrated to an appropriate concentration by distillation in a rectifying column for use in leaching the lithium values from the lithium-rich minerals (i.e. in the digestion stage of process block 1).

The off-gases shown leaving the top of the absorption tower 30 are a blend of atmospheric nitrogen, some residual oxygen and small quantities of water vapour and un-reacted oxides of nitrogen. The exhaust gases may then be blended into the inlet air supply passing to the spodumene calciner (i.e. in process block 1). In a variation, the pressurized tail gases may be fed to a suitable gas turbine to recover energy therefrom.

The process set-up as shown and described in FIG. 2 relates most closely to the case where the original lithium-rich mineral to be processed comprises spodumene. However, it should be understood that the process set-up of FIG. 2 is not to be taken as limiting the scope of the total process to this mineral. As disclosed earlier, other minerals and lithium salts can constitute the feed to plant and equipment for the production of pure lithium nitrate crystals.

Lithium Metal Production (FIGS. 3 & 4)

Referring now to FIG. 3, the blend of lithium nitrate and lithium oxide (Nitrolox) is prepared to the appropriate recipe in a re-melting/storage vessel 41 (e.g. the blend may be trimmed by the addition of further lithium nitrate). Vessel 41 can be heated using hot molten nitrate, etc. salt circulating in a jacket around the vessel to a temperature of the order of 400° C.

The hot blend is drawn off at a controlled rate and fed to the carbothermal reduction furnace 40, which is typically operated under pressure. Also fed to the furnace 40 is a supply of carbon in the form of substantially ash-free coke derived from coal that has been stripped of any ash-forming mineral matter by means of acid- and alkaline-washing processes as understood by persons skilled in the relevant art. Alternatively, some coals (e.g. from parts of Indonesia and from New Zealand) already contain naturally very low levels of ash, and these may not need to be chemically cleaned. Similarly, there are grades of petroleum coke that also contain very low levels of ash (although 'bottom' petroleum cokes rarely fall into this category). Once the coal has been chemically de-ashed as required, the substantially ash-free coal is pyrolised (in an embodiment) in a coke oven to drive off essentially all volatiles to minimise the hydrogen content of the coal/coke. Alternatively, graphite may be used as the source of carbon so long as it contains little if any ash, preferably less than 0.5 wt. %, and even better, less than 0.2 wt. %.

Typically, the contents of the furnace 40 are maintained at temperatures above 1,500° C. (potentially as high as ~2,000° C.). The furnace 40 can optionally comprise suitably placed induction coils 43 (e.g. solenoids incorporated into the walls of the furnace that substantially enclose the contents of the furnace 40 and that surround the de Laval discharge nozzle 42). In another embodiment (not shown) the required temperatures may be maintained by way of carbon electrodes from which electric arcs are struck between their tips and the carbon briquettes in the furnace 40.

The furnace 40 is designed to operate with contents sustained at temperatures above 1,500° C. Thus, the furnace 40 can be lined throughout by graphite or other compacted-carbon bricks. In embodiments, when the feed to the furnace 40 comprises lithium values solely in the form of lithium oxide, or Nitrolox blends containing very little lithium nitrate, the high temperatures required for lithium reduction can be sustained by electrical energy supplied through the induction coils 43. In other embodiments, when the Nitrolox blend supplied to the furnace 40 comprises a higher proportion of lithium nitrate, the energy released from the reaction between lithium nitrate and carbon (Reaction 15)) can partially displace some of the electrical energy used where the lithium is supplied as lithium oxide alone.

In the embodiment of FIG. 3, additional lithium nitrate may be added to the Nitrolox blend in the storage vessel 41 (i.e. the contents of vessel 41 can be constantly monitored to ensure a substantial, but controlled content of lithium nitrate is present in the furnace feed).

In operation, low-ash carbon, in the form of briquettes of essentially uniform size, made without recourse to binders, is added to the furnace 40 by way of a plurality of inlets that discharge close to the walls, as indicated in FIG. 3 (this sectional view shows only two, however, in practice there can be at least four, and six or more such inlets evenly spaced around the circumference of the furnace, and even more for larger furnaces). This causes the resultant carbon bed to form an inwardly conical-type surface which naturally forms in the course of routine operation of the furnace.

Nitrolox is centrally added from above the furnace in a manner such that it falls as a single stream into the centre of the reactor 40 (i.e. generally into the central lower part of the conical-type surface of the carbon bed), whereupon it impacts the carbon. A strongly exothermic reaction ensues as per reaction 15), reproduced again here.

$$2LiNO_3 + 6C \rightarrow 2Li + 6CO + N_2 \qquad 15)$$

Meanwhile, the lithium oxide present in the Nitrolox reacts according to reaction 14), reproduced again here:

$$Li_2O + C \rightarrow 2Li + CO \qquad 14)$$

As set forth above, along with supplied energy, the supplemental energy that is supplied from an optimal balance between lithium nitrate and lithium oxide is such that, during operation, an optimum temperature of 1,500° C. or higher is secured, i.e. that ensures that the lithium metal produced according to either reaction 14) or 15) remains in a vapour phase.

In the embodiment shown in FIG. 3, reactions 14) and 15) serve to remove solid carbon from the area labelled 'combustion zone' as the gas carbon monoxide. This leads to an essentially continuous inflow of carbon from close to the sides of the furnace 40 into the centre, whereupon this carbon and the Nitrolox blend react to yield all gaseous or vapour products (the right-hand sides of reactions 14) and 15)). It follows that the highest temperatures within the reactor 40 are confined to its central regions; temperatures progressively decline towards the walls. This places fewer stresses on the individual components of the reactor 40 and reduces heat losses from it.

The carbon is also fed at a rate that ensures the combustion zone remains comfortably above the base of the reactor. The Nitrolox blend is fed at a rate that maintains the correct operating temperature and pressure within the reactor 40, as well as a suitable flow of hot gases and vapours through the convergent-divergent (de Laval) nozzle 42. As above, the composition of the Nitrolox blend may be finely adjusted in the storage vessel 41 to ensure these criteria are met. In an embodiment, overall temperature levels are sustained at the requisite high temperatures by means of electrical heating, such as by way of induction coils 43 built into the reactor 40.

FIG. 4 shows a variation of the furnace 40, where the furnace 40 takes the form of a refractory-lined pressure vessel 40'. In addition, the Nitrolox blend is fed via a blending unit 45, where additional lithium nitrate (left-hand stream) can be blended into the Nitrolox feed (right-hand stream) to the vessel 40' as part of a process control procedure. FIG. 4 also shows a molten slag tap 47. Otherwise, the vessel 40' is similar to and operates in a similar manner to the furnace 40 as described herein.

In a like manner to the gunpowder reaction, it will be apparent that reaction 15) is sustained when there is a sufficient supply of lithium nitrate. Were this flow of lithium nitrate to be interrupted, the reaction would stop. It would recommence when the flow of lithium nitrate is recommenced. Thus, lithium nitrate flow as well as its ratio in the Nitrolox blend that is fed into the furnace can be used as a process control variable.

The logic behind U.S. Pat. No. 9,090,954 dictates that induction coils (i.e. such as shown in FIG. 3 by coils 43 in nozzle 42) should be incorporated into the de Laval nozzle 42 (i.e. to surround the throat) to ensure its throat when in operation remains hot enough to preclude the condensation of refractory solids on its surfaces. As set forth above, the process disclosed herein can minimise the entry into the furnace 40 of impurities by supplying a pure lithium nitrate (and thus a pure Nitrolox), as well as by the use of very low ash carbon. Thus, in the course of normal operation, it should not be necessary to energise the coils 43 in nozzle 42.

The off gases and vapours (according to the right-hand sides of reactions 14) and 15)) will rise from the combustion zone and tend to carry with them, traces of carbon, lithium oxide, and traces of any other refractory oxides that may have entered the system in the feed streams. The presence of fine carbon particles dispersed through the off-gases will ensure conditions within the furnace 40 remain strongly reducing, hence preventing reactions 14) and 15) operating in the reverse (right to left) directions. In order to prevent these reverse reactions, the gases and vapours produced on the right-hand sides of reactions 14) and 15) are flash-cooled. This is accomplished by ensuring that the only exit from the furnace 40 is via the de Laval nozzle 42. Flow through the throat of this nozzle is sonic but, as the gases and vapours expand and accelerate to supersonic velocities in the divergent part of the nozzle, this acceleration is sufficient to reduce their temperature from as much as 2,000° C. to temperatures as low as 300° C. in less than a millisecond. At these temperatures, the conditions for reactions 14) and 15) to proceed in the reverse direction no longer exist, and thus the lithium vapour promptly condenses to fine droplets of liquid lithium metal.

In the embodiment of FIG. 3, this supersonic flow of gases and vapours is passed to a bank of cyclones 44. The lithium droplets are stripped from the gas flow, and leave the cyclone banks 44 as underflow outlets (spigots). Liquid lithium flows from their spigots into the raw liquid lithium storage tank 45, which is kept at a temperature such that its contents remain liquid, (i.e. at temperatures above 180° C. and preferably above 200° C.). This molten lithium may well contain small quantities of refractory solids: carbon, lithium oxide and perhaps other minerals. The stored lithium metal may be readily purified by vacuum distillation; appropriate equipment for this is not shown in FIG. 3.

Vacuum conditions can be maintained throughout the equipment downstream of the de Laval nozzle 42 by means of a liquid ring vacuum pump 46, with the liquid being employed typically comprising process water. Besides generating sufficient vacuum conditions to ensure an at least 5-fold reduction in pressure across the de Laval nozzle 42, the liquid ring also serves to scrub residual lithium values from the carbon monoxide (plus some nitrogen) gas flow. The resultant scrubbed gases serve as fuel, able to supplement the energy supplied by natural gas elsewhere in the process, including for the calcining of raw spodumene. In cases where the lithium nitrate does not originate from the refining of spodumene ore concentrates (e.g. it is a product of mining operations in the South American salars), other uses for the gas fuel may be found, such as the generation of electricity.

Further Variations

It is to be understood that wide variations will be encountered across the range of natural lithium sources encompassed in this specification. Practical engineering steps will be taken to ensure that such unique characteristics are adequately taken into consideration. As well, other unit operations can be included in the overall process in line with good engineering practice, in particular, for the provision of services and utilities, the efficient utilisation of waste heat, the conservation of water, and the minimisation of all waste streams.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features.

The invention claimed is:

1. A process for producing a mixture of lithium oxide and lithium nitrate from a lithium nitrate starting material, the process comprising:
    thermally decomposing at a temperature greater than about 600° C. the lithium nitrate starting material such that a fraction of the lithium nitrate starting material decomposes to lithium oxide and a remaining fraction of the lithium nitrate starting material does not decompose to lithium oxide,
    wherein the thermal decomposition is terminated after a determined time period to ensure the remaining fraction of lithium nitrate, thereby forming the mixture of lithium oxide and lithium nitrate, and wherein the fraction of lithium nitrate starting material that is thermally decomposed to lithium oxide is no more than 96% by weight of the lithium nitrate starting material.

2. The process according to claim 1, wherein terminating the thermal decomposition after the determined time period comprises cooling the mixture to below a decomposition temperature of 600° C.

3. The process according to claim 2, the process further comprising cooling the mixture of lithium oxide and lithium nitrate to a temperature of less than 260° C., thereby producing a solid mixture of lithium oxide and lithium nitrate.

4. The process according to claim 3, wherein the solid blend mixture of lithium oxide and lithium nitrate is produced so as to take the form of one or more of: prills, pellets, flakes.

5. The process according to claim 1, the process further comprising heating the solid mixture of lithium oxide and lithium nitrate so as to form molten lithium nitrate that comprises the lithium oxide dispersed therein, and further comprising adding thereto: a transition-metal oxide, a hydroxide, a carbonate, a nitrate, or any combination thereof.

6. The process according to claim 1, wherein the lithium nitrate starting material is molten lithium nitrate salt.

7. The process according to claim 1, wherein the thermal decomposition also produces gases comprising oxygen and oxides of nitrogen, and wherein the process further comprises passing said gases to a nitric acid production stage.

8. The process according to claim 1, wherein the thermal decomposition also produces gases, and wherein the thermal decomposition comprises direct or indirect heating of the lithium nitrate starting material.

9. The process according to claim 1, the process further comprising converting the mixture of lithium oxide and lithium nitrate to lithium metal.

10. The process according to claim 1, wherein the lithium nitrate starting material comprises a salar.

11. The process according to claim 1, wherein the lithium nitrate starting material is a lithium nitrate solution produced from a salar by a process comprising: taking a lithium-rich brine (LiCl) from a salar-treatment stage and adding a nitrate salt thereto to obtain a resulting mixture, and subjecting the resulting mixture to a thermal treatment stage so as to produce the lithium nitrate solution.

12. The process according to claim 11, wherein the nitrate salt is Chile saltpetre ($NaNO_3$).

13. The process according to claim 11, wherein the thermal treatment stage comprises evaporation.

14. A process for producing liquid lithium nitrate with solid lithium oxide therein, from a lithium nitrate starting material, the process comprising:
    thermally decomposing the lithium nitrate starting material by heating the lithium nitrate tarting material to a temperature that is 600° C. or greater such that a fraction of the lithium nitrate starting material decomposes to lithium oxide and a remaining fraction of the lithium nitrate starting material does not decompose to lithium oxide, wherein the fraction of lithium nitrate starting material that is thermally decomposed to lithium oxide is no more than 96% by weight of the lithium nitrate starting material, and thereby producing a resulting mixture comprising lithium nitrate and lithium oxide; and
    cooling the resulting mixture comprising lithium nitrate and lithium oxide to a temperature that is below 600° C. and that is above the melting temperature of the lithium oxide, thereby obtaining the liquid lithium nitrate with solid lithium oxide therein.

15. The process according to claim 14,
    wherein said cooling of the resulting mixture comprising lithium nitrate and lithium oxide comprises: cooling the resulting mixture comprising lithium nitrate and lithium oxide to a temperature that is below 600° C. and above 260° C.

16. The process according to claim 15, the process further comprising: cooling the liquid lithium nitrate with solid lithium oxide therein to a temperature that is under 260° C., thereby producing solid lithium nitrate with solid lithium oxide therein.

17. The process according to any one of claims 14-16, wherein the fraction of lithium nitrate starting material that is thermally decomposed to lithium oxide is no more than 90% by weight of the lithium nitrate starting material.

18. The process according to any one of claims 14-16, wherein the fraction of lithium nitrate starting material that is thermally decomposed to lithium oxide is in the range of from 50-90% by weight of the lithium nitrate starting material.

19. The process according to any one of claims 14-16, wherein the fraction of lithium nitrate starting material that is thermally decomposed to lithium oxide is in the range of from 70-90% by weight of the lithium nitrate starting material.

* * * * *